US005664146A

United States Patent [19]
Bolin et al.

[11] Patent Number: 5,664,146
[45] Date of Patent: Sep. 2, 1997

[54] GRAPHICAL USER COMMUNICATIONS INTERFACE FOR AN OPERATOR IN A MANUAL DATA STORAGE LIBRARY

[75] Inventors: Mark Robert Bolin, Springfield, Oreg.; James Arthur Fisher; Robert Samuel Goncharsky, both of Tucson, Ariz.

[73] Assignee: International Business Machines Corporation, Armonk, N.Y.

[21] Appl. No.: 606,632

[22] Filed: Feb. 26, 1996

Related U.S. Application Data

[63] Continuation of Ser. No. 235,079, Apr. 29, 1994, abandoned.

[51] Int. Cl.$^6$ .............................. G06F 12/00; G06F 13/00
[52] U.S. Cl. ........................ 711/115; 395/326; 395/833; 711/114
[58] Field of Search .................................. 395/833, 404, 395/441, 442, 444, 326, 335, 353; 360/85, 92, 96.5, 98.01, 99.02, 99.06

[56] References Cited

U.S. PATENT DOCUMENTS

| | | | |
|---|---|---|---|
| 4,283,621 | 8/1981 | Pembroke | 235/375 |
| 4,399,936 | 8/1983 | Rueger | 226/92 |
| 4,413,328 | 11/1983 | Videki, II | 395/118 |
| 4,435,762 | 3/1984 | Milligan | 395/250 |
| 4,601,003 | 7/1986 | Yoneyama et al. | 395/159 |
| 4,725,977 | 2/1988 | Izumi et al. | 395/442 |
| 4,860,133 | 8/1989 | Baranski | 360/92 |
| 4,945,428 | 7/1990 | Waldo | 360/92 |
| 4,945,429 | 7/1990 | Munro et al. | 360/92 |
| 4,964,039 | 10/1990 | Izawa et al. | 395/500 |
| 4,974,156 | 11/1990 | Harding et al. | 395/489 |
| 4,987,533 | 1/1991 | Clark et al. | 395/620 |
| 5,129,076 | 7/1992 | Freeman et al. | 395/438 |
| 5,134,580 | 7/1992 | Bertram et al. | 395/651 |
| 5,241,662 | 8/1993 | Maniwa et al. | 395/421.08 |
| 5,303,214 | 4/1994 | Kulakowski et al. | 369/34 |
| 5,325,523 | 6/1994 | Beglin et al. | 395/616 |
| 5,343,403 | 8/1994 | Beidle et al. | 364/478 |
| 5,437,014 | 7/1995 | Bushoom et al. | |
| 5,450,384 | 9/1995 | Dahman et al. | 369/30 |
| 5,450,545 | 9/1995 | Martin et al. | 395/701 |
| 5,455,409 | 10/1995 | Smith et al. | 235/385 |

FOREIGN PATENT DOCUMENTS 0 535 922  4/1993  European Pat. Off. .

OTHER PUBLICATIONS

Koontz, *Xpress Librarian*, PC Magazine, v12, n16, p311 (3), Sep. 28, 1993.

Gallenberger et al., *Kodak optical disk and microfilm technolgies carve niches in specific applications*, Optical Information Systems, v. 9; n3, p127 (4), May–Jun. 1989.

Ali, *Retrieval commands of CD–ROM databases: a comparison of selected products*, CD–ROM Professional, v3, n3, p28(6), May 1990.

(List continued on next page.)

*Primary Examiner*—Matthew M. Kim
*Attorney, Agent, or Firm*—Baker, Maxham, Jester & Meador

[57] ABSTRACT

An operator to host communications interface for managing a manual data storage library. A host processor controls Peripheral Data Storage Devices (PDSDs) in the library. Displayed operator interaction fields are presented by a graphical user interface on the screen of a display device connected to a library manager controller. Library manager program code loaded in program memory in the library manager controller is provided with interface logic, for communicating with external devices, as well as the PDSDs through the host processor. The operator communications interface is an integral component of the library and thus may be used for: alerting an operator of the need to mount or demount a particular data medium; alerting an operator with coherent and succinct messages thus improving the quality of messages provided to operators; and alerting an operator with a minimum number of messages. Additionally, the operator may use the communications interface to access the status of PDSDs and to schedule maintenance activities, such as cleaning of the PDSDs.

42 Claims, 16 Drawing Sheets

OTHER PUBLICATIONS

*New XL/Datacomp Automated Mass Storage Solution Features Tape Library from ATL Products,* PR Newswire, p0607LA013, Jun. 7, 1993.

Bell, *Providing remote access to CD-ROMS; some practical advice,* CD-ROM Professional, v6, n1, p43(4), Jan. 1993.

Schroeder, *Auto-loaders gain management; storage software controls tape devices,* PC Week, v11, n14, p55(2), Apr. 11, 1994.

Hamilton, *Tape automation comes of Age,* Computerworld, p. 33, Feb. 19, 1990.

Schoeniger, *Data pecking order,* DEC Professional, v13, n1, p24(9), Jan. 1994.

*The Pros Talk For 2.5,* DBMS, v6, n13, p48(1), Dec. 1993.

Mezick, *Muscle 2.1 beefs up Visual Basic's functionality,* InfoWorld, v15, n37, p113(1), Sep. 13, 1993.

Notess, *A User Interface management system for HP-UX System administration applications,* Hewlett-Packard Journal, v44, n3, p80 (5), Jun. 1993.

T. W. Beglin and H. E. Kamionka, "User Controls During Tape End-Of-Volume Processing", IBM Technical Disclosure Bulletin, vol. 26, No. 3A, Aug. 1983, pp. 1303,1305.

R. S. Goncharsky, J. W. Peake and R. A. Ripberger, "Logical Group of Data Storage Media in a Library System" IBM Technical Disclosure Bulletin, vol. 35, No. 5, Oct. 1992, pp. 17–20.

Gerald J. Wade, Multi-Terabyte Automated Mass Storage, IEEE Symposium on Mass Storage Systems, May 1990, pp. 51–57.

GRAPHICAL USER COMMUNICATIONS INTERFACE FOR AN OPERATOR IN A MANUAL DATA STORAGE LIBRARY

This application is a continuation of application Ser. No. 08/235,079, filed Apr. 29, 1994, now abandoned.

DOCUMENTS INCORPORATED BY REFERENCE

The following documents are, by this reference, incorporated in their entirety:

U.S. Pat. No. 4,974,156, issued on Nov. 27, 1990, and assigned to the assignee of this application;

U.S. Pat. No. 4,945,428, issued on Jul. 31, 1990, and assigned to the assignee of this application;

U.S. Pat. No. 4,435,762, issued on Mar. 6, 1984, and assigned to the assignee of this application; and U.S. Pat. No. 4,339,936, issued on Aug. 23, 1983, and assigned to the assignee of this application.

BACKGROUND OF THE INVENTION

1. Field of the Invention

The present invention generally concerns a method for operating a storage library and a system therefor. More particularly, the method and system provide a graphical interface and logic which support communications with a manual data storage library.

2. Description of Related Art

Modern computer systems require large quantities of information storage. To meet this requirement computer data storage is available in many forms. A fast, but expensive, form of data storage is main memory, typically including monolithic semiconductor circuits. Other available forms of data storage, known as peripheral data storage devices (PDSDs), include magnetic direct access storage devices (DASD), magnetic tape storage devices, and optical recording devices. These types of data storage actually store data on electromagnetic or optical media. Each of these other types of data storage has a greater storage density and lower cost than main memory. However, these other devices require mechanical movement and therefore have slower data access times than purely electronic main memory.

Storing all system data in main memory is costly; however, storing all system data on one or more peripheral storage devices reduces performance. Thus, a typical computer system includes both main memory and one or more PDSDs arranged in a data storage hierarchy. In such a hierarchy, main memory is often referred to as the primary data storage. The next level of the hierarchy is known as the secondary data storage, and so on. Generally, the highest level of the hierarchy has the lowest storage density capability and capacity, the highest performance, and highest cost. Down through the hierarchy, storage density and capacity generally increases, performance generally decreases, and associated costs generally also decrease. By transferring data between different levels of the hierarchy, as required, cost and performance are optimized.

Therefore, in order to have the required information available on an "as needed" basis, much storage at the lowest level of the hierarchy is required. Most business applications require numerous disks or tapes to meet the lowest level storage needs. Data storage libraries have been developed to manage the storage of such disks or tapes. Some storage libraries employ automatic means including robotic picker and gripper devices to store and access data storage media. Others do not employ automatic means, but rather rely on human operators to store and access data storage media when needed. Those storage libraries relying on human operators are referred to as "manual data storage libraries".

Manual data storage libraries remain popular as a choice over automated libraries because manual libraries do not require a large capital investment. Also, manual libraries allow a human operator to maintain more control over the library. Unfortunately, human operators have difficulty in competing with the efficiency and accuracy of robotic means. In particular, there is no known efficient way of alerting an operator of the need to mount or demount a particular data storage medium from a particular PDSD while still allowing an operator to communicate directly with the PDSD. For example, an operator may need to know when it is critical to mount a medium on a particular PDSD but may be obliged to change to a new PDSD, so that the current in use PDSD may be serviced.

Manual data storage libraries include a plurality of storage bins or slots for retaining data storage media, such as magnetic tapes, magnetic disks, or optical disks, and also include one or more PDSDs. Each data storage medium may be contained in a cassette or cartridge housing for protection. An operator must be alerted to transfer any storage medium between the storage bins and an available PDSD. In this regard, a PDSD having a storage medium mounted therein and allocated for use is referred to as "unavailable". Conversely, a PDSD without a storage medium mounted therein or unallocated is referred to as "available". Once a data storage medium is mounted in a PDSD and the medium is allocated for use, data may be written to or read from that medium for as long as the system requires. Data is stored on a medium in the form of one or more files, each file being a logical data set.

It is not uncommon for a large data set to span several hundred cartridges or cassettes in the case where the storage medium is tape. A single cartridge is given a volume serial number, which is referred to as a "volser". When a data set is requested, the actual cartridges containing the entire data set are likely to be dispersed in a plurality of storage bins located throughout the library. The cartridges are identified by their respective volsers. Accordingly, it is critical that an operator be alerted promptly of the need to mount or demount the cartridges containing the requested data set, in order for data processing to continue.

Prior art techniques for alerting an operator in a manual data storage library include programs for intercepting messages sent from the host to PDSDs and then sending a text-based message to the operator. Unfortunately, this results in a large quantity of messages being sent to an operator console. An operator may be inundated with short-lived messages that are often cryptic and therefore difficult to learn and interpret. Thus, reliability and efficiency suffer as an operator's attention is diverted from performing useful tasks in the library.

Referring to FIG. 1, a block diagram for a prior art manual data storage library is shown. A host computer, such as the IBM 3090, has within it code for processing job requests within a data storage library. Such code may include a master scheduler module 102 and a console control program 104. The master scheduler program 102 is responsible for determining which devices are available and where job requests should be sent. The console control program 104 is responsible for updating and sending messages to an operator console 106. Each host in a manual data storage library, which may have a plurality of hosts, has an operator console, such as operator console 106. The operator console is used to alert an operator of actions that the operator must take to keep the subsystem 129 running efficiently. The subsystem 129 may contain at least one control unit such as the control unit 124. In the illustrated example of FIG. 1, the control unit 124 has the task of communicating jobs and messages from the host 100 to a peripheral data storage device (PDSD) 127. Devices such as tape devices (not shown) within the PDSD 127 are controlled by the control unit 124. Together the PDSD 127 and at least one control unit comprise a PDSD subsystem 129. The host 100 has a task of allocating jobs to devices within the PDSD subsystem. The status of all devices within the PDSD subsystem is stored on a database 111 on a hard disk 110. The host 100 has access through a data path 108 to the database 111 and can read or write data on the disk 110. The database 111 stores information relating to the status of all PDSDs within library 139. The library 139 comprises at least one subsystem 129 and its associated media (not shown) and media storage 137.

There may be a plurality of hosts, such as the host 100 and the host 114, which have access to a data storage library, such as the library 139. Each host system must have at least identical components to that which the host 100 has. Thus, the host 114 has a master scheduler program 116 and a console control program 118. Additionally, the host 114 has an operator console 120 for relaying messages to an operator. Such messages are related to activities within the library 139. Unfortunately, access to the database 111 where library information is stored, may only be controlled by one host. Thus, the host 114 has only read access (the ability to read but not write data) through the data line 112 to the database 111 stored on the hard disk 110. This results in slow processing time, as all jobs must be queued through the host 100 or alternatively a mechanism for sharing update authority to the queue must be provided.

Another disadvantage of the prior art architecture is that one operator may have to view many operator consoles to understand his tasks. For this reason, large message display panels have been mounted on prior art library floors to consolidate messages from various operator consoles. Such large message display panels are common and well known in the art. Such displays rely on so-called "snooper programs", such as programs 134 and 135, to intercept messages from a host to an operator console and interrogate internal operating system control structures in order to display operator messages in one location, such as a large message display panel 122.

In general, snooper programs, such as programs 134 and 135, reside in the host and attempt to interpolate conclusions based on intercepted events that are meaningful for their particular purpose. Unfortunately, these snooper programs are not part of the host operating system, rather they are typically third-party added software. Given the alien nature of these programs, they are not privileged to view the activity queues of the operating system and thus may miss significant events. For example, a PDSD, such as PDSD 127, may be mounted and remounted while a snooper program is held in a waiting state by the control program (e.g., 104 or 118). Snooper programs inherently miss events and then react inappropriately to other events that are not understood due to events missed. Thus, such programs are a prevalent cause for so-called "system outages", i.e., host system not available for its assigned task.

The network 128 connects the host 100, the host 114, a large message display panel 122, control units 124 and 126, and a PDSD 127. Such a network may contain other devices (not shown), such as an optical scanner or a personal computer. A scanner might be used to read bar code labels containing serial numbers. A personal computer might have any number of tasks within a computing environment. Unfortunately, since such devices are not part of the general architectural scheme there are likely to be associated disadvantages. Such disadvantages may include having to write special program codes to allow these devices to work in an ad hoc fashion in the network 128. Another disadvantage includes inefficient performance of devices and the possibility of missing significant events because the library is not designed for their use.

FIG. 2 shows the steps involved in the prior art for mounting a cartridge on a device within the PDSD subsystem 129, shown in FIG. 1. This figure will be most readily understood, by referring back to the block diagram shown in FIG. 1. In step 136, a host receives a job control language job request for a specific volser, implying a request to mount a cartridge having a specific volume serial number. The job request is passed to the master scheduler program in step 138. The master scheduler program checks, in step 140, to see if the next device is available. If the answer to the master scheduler's inquiry is "no" then processing passes to step 142. If there are no more devices to check, the request is queued for later processing when devices are released, as shown in step 146. However, if there are more devices to check, the master scheduler program loops back to step 140 to see if the next device is available. If a device is available to be mounted, then the master scheduler sends a message to the console control program (step 147). In step 148, the console control program sends a non-deletable mount message to the operator console. The message is said to be non-deletable because the message lines will be retained on the screen, or in a console queue, until their associated action is completed and a "Delete Operator Message" is executed. Thus, this non-deletable mount message will remain on the operator console until cleared by the master scheduler program, after the device is placed in a ready state by the operator. In step 150, an inquiry is made whether the requested volsers have been read at a device. If the answer is "no", the message remains non-deletable on the operator message console, as shown in step 152. Referring now to the non-deletable operator messages in step 148 and step 152, it can be seen that in step 154, a host "snooper program" posts a message on the large message display panel in order to consolidate messages. However, if the answer to the inquiry in step 150 had been "yes", then the master scheduler would have marked a control block in host memory to indicate that the job allocation is complete, as shown in step 156. Next, the operator console message is deleted, as shown in step 158. Finally, in step 160, the host database 111 is updated on host disk storage.

Thus, it will be appreciated that prior art systems are lacking in efficiency. Such systems may be unreliable, as well, because operators often become confused by an overwhelming number of messages which cannot be removed from the operator console. In this situation, the console queue becomes filled with screen after screen of non-scrollable messages, while library tasks are neglected, because they are not yet visible to the operator.

Therefore, there is a manifest need to improve the reliability and efficiency of library-to-operator communications in a manual storage library. Providing coherent yet succinct messages to an operator would increase reliability in a manual data storage library because an operator's attention would be directed quickly to important tasks. Reducing the quantity of messages would also increase efficiency, since an operator could be sure that messages received pertained to important events, such as medium mounting or demounting.

What is further needed is a system having the advantages described above, yet which allows an operator to retain control of the library and in particular, the PDSDs. A communications interface that is an integral component of the library would provide an operator control of and constant communication with all elements of the library.

A further shortcoming of manual data storage libraries is the inability to easily catalog newly added media. What is needed in this regard is a way for an operator to easily take data entered from input devices (e.g., scanners used to read volume serial numbers from cartridges) and efficiently add this data to a database which is accessible to a host which controls PDSDs.

Thus, there is a need in the art for an interface which is an integral component of a manual data storage library and possesses all of the advantages described above.

SUMMARY OF THE INVENTION

It is therefore an object of the present invention to provide a communications interface for an operator which is an integral and reliable component of a manual data storage library.

It is a further objective to provide the reliability factors of an automatic data storage library in a manual data storage library while still allowing an operator to maintain control over the library.

It is a still further objective of the present invention to provide an operator communications interface which is an integral part of a manual data storage library and capable of alerting an operator of the need to mount or demount a particular data medium, alerting an operator with coherent and succinct messages thus improving the quality of messages provided to operators, and alerting an operator with a minimum number of messages.

It is a further objective of this invention to allow external input devices to communicate with an operator. Another objective is to enable an operator to use data from external input devices to add new data volumes to the library's catalog.

Another objective of this invention is to allow a host processor to communicate the status of PDSDs to an operator, and to allow an operator to add data to a library database which is accessible to a host processor.

In accordance with the foregoing objectives an operator communications interface for a manual data storage library is disclosed. A graphical user interface (GUI) in a library presents graphical user interaction fields on the screen of a connected display. Logic is provided in a library manager controller for interfacing with external devices as well as PDSDs and a host processor. The GUI provides a communication interface for an operator and the other devices in the library, particularly the PDSDs. The GUI can be accessed through logic by a host which controls the PDSDs.

An operator GUI is an integral component of the library of the invention and thus may be used for alerting an operator to the need for mounting or demounting a particular data medium, providing an operator with coherent and succinct messages for executing library operation, and alerting an operator with a minimum number of messages.

The foregoing, together with other objects, features and advantages of this invention, will become more apparent when referring to the following specification, claims and the accompanying drawings.

BRIEF DESCRIPTION OF THE DRAWING

The objects, advantages and features of the present invention will be more clearly understood by reference to the following detailed disclosure and the accompanying drawing in which.

DETAILED DESCRIPTION OF THE PREFERRED EMBODIMENTS

Figure 1:
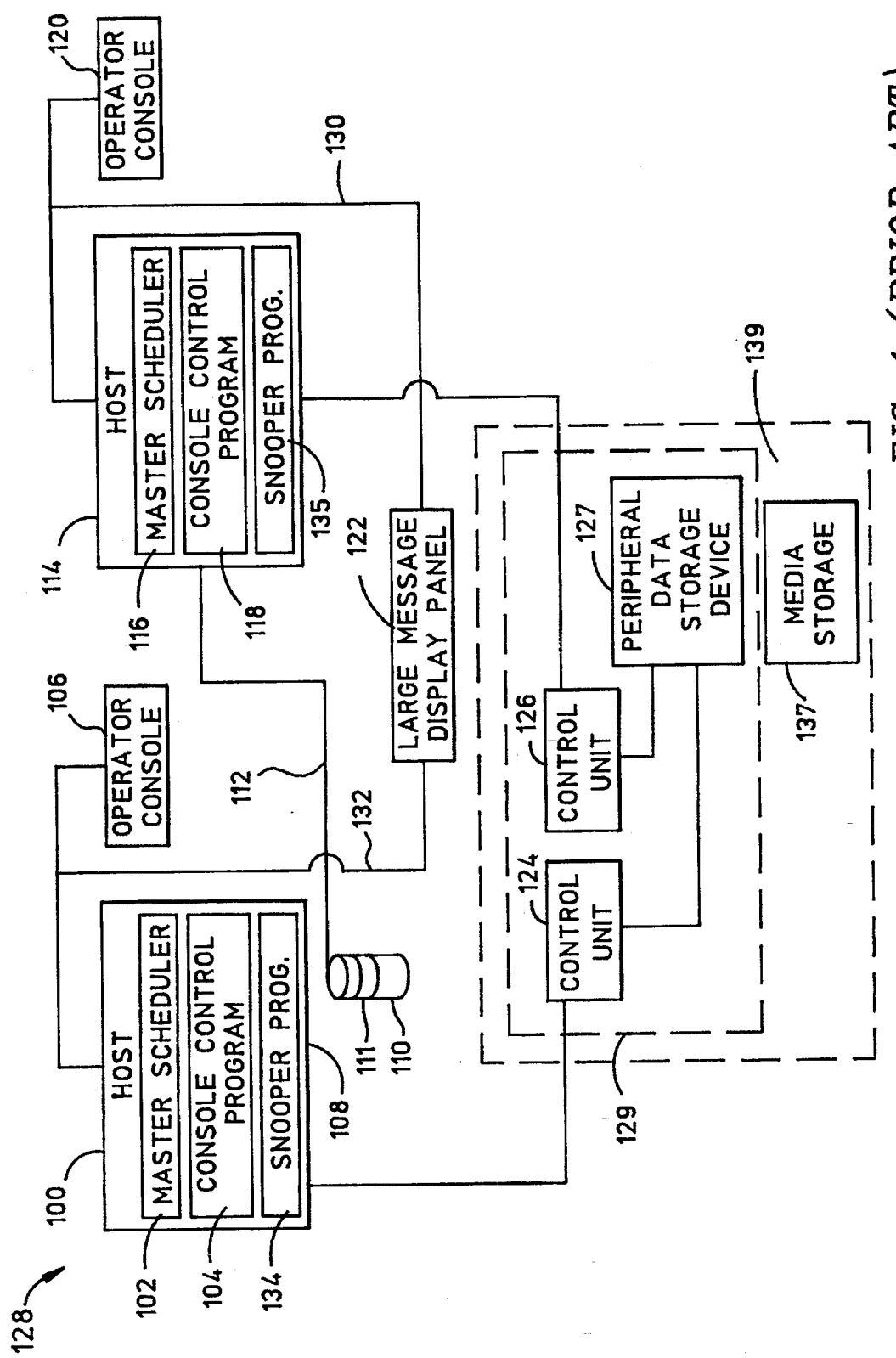
FIG. 1 is a simplified block diagram of a prior art manual data storage library environment.
Figure 2:
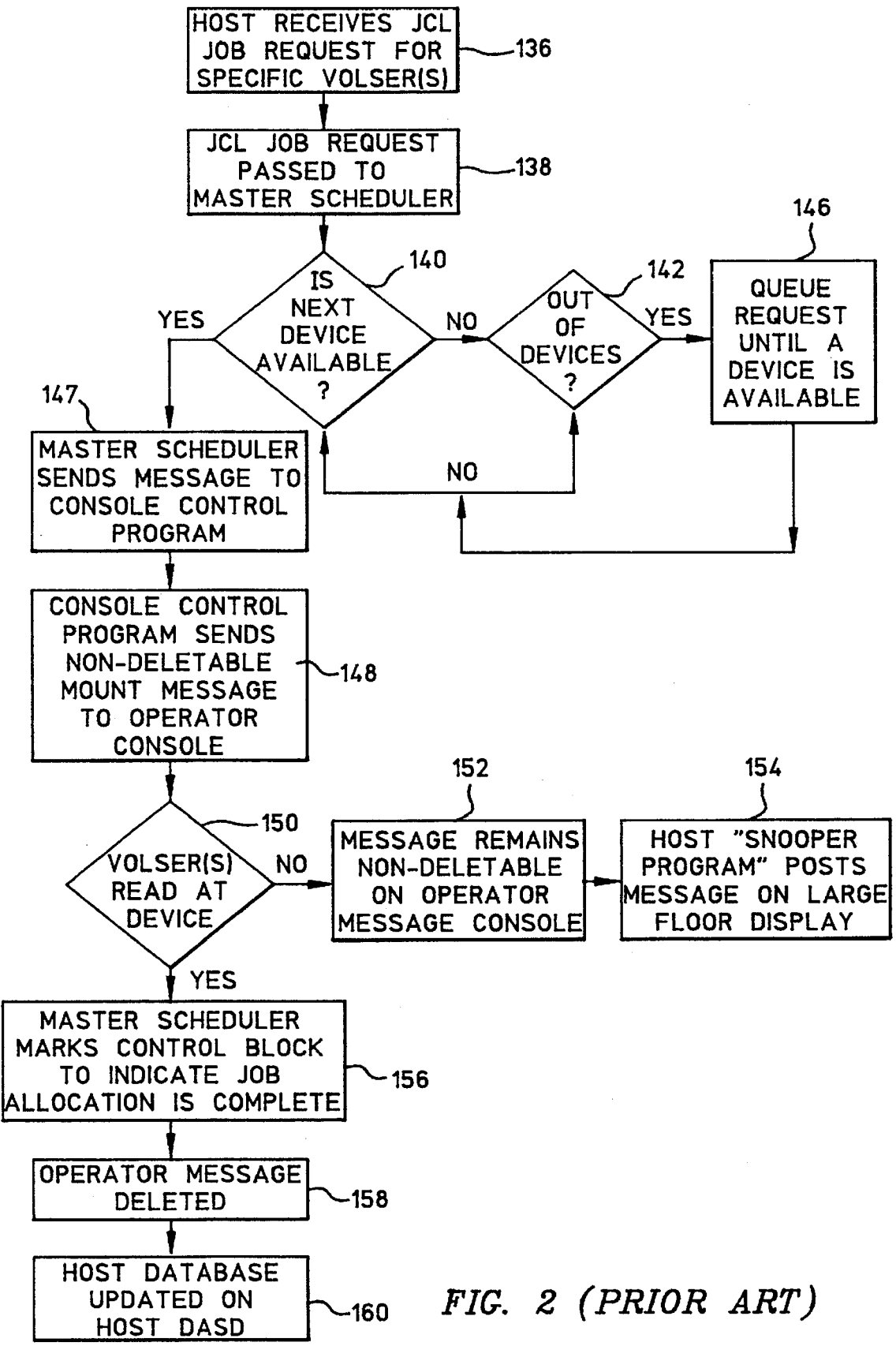
FIG. 2 is a flow diagram of a prior art method of alerting an operator to mount data volumes on PDSDs in the prior art manual data storage library illustrated in FIG. 1.
Figure 3:
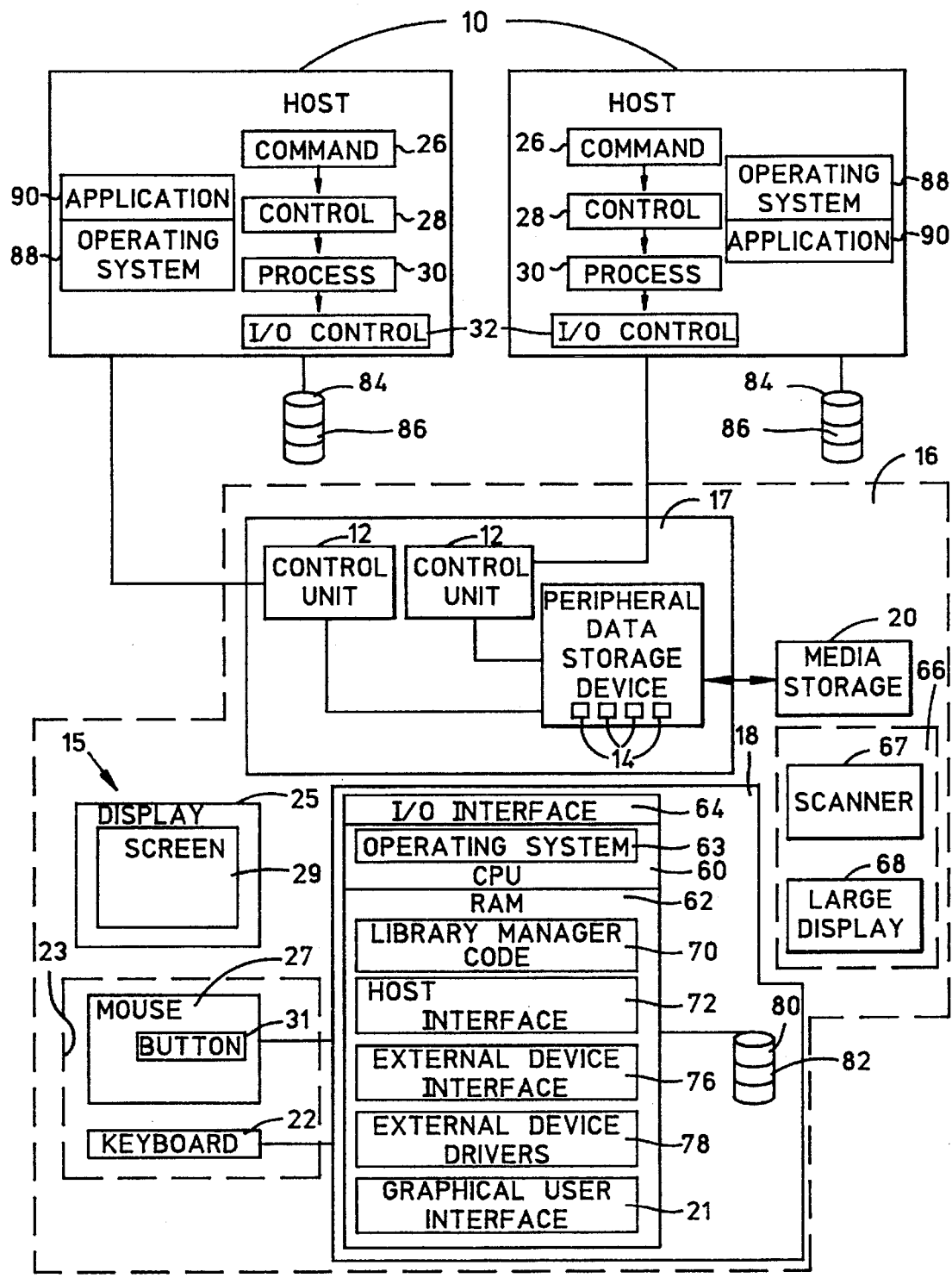
FIG. 3 is a block diagram of an improved manual data storage library including a preferred embodiment of a library work station useful with the present invention.

A data processing environment, as shown in FIG. 3, includes one or more host processors 10 having a set of peripheral subsystems, many of which can be data storage subsystems. Two hosts are shown to illustrate a plurality, but it should be understood that a larger or smaller number of hosts will work with the present invention. The data storage systems include a plurality of control units 12, as is well known. One or more PDSDs 14 and attached control units 12 comprise subsystem 17 and may constitute a secondary peripheral data storage level of a data storage hierarchy. The control units interact with the host 10 to execute host commands that control PDSDs. Together the host 10 and the control units 12 comprise a host processing control means. The host 10 has at least one read/write storage device 84, such as a hard disk, for storing data in a database 86 containing data related to the status of PDSDs 14.

A media library, such as the library 16, may include manual data storage techniques and apparatus of known design. The library 16 is adapted to receive removable media. The library 16 of the present invention is one that uses sequentially recorded data on media which may include magnetic tapes, magnetic disks, and optical disks. Such a library may include the PDSD subsystem 17 and may be embodied in an IBM 3495 Tape Library Data Server. The subsystem 17 has tape cartridges (not shown) mountable on PDSDs 14, such as tape drives, for providing data communication between the volumes of data stored in each cartridge and the control units 12. The library also includes a library manager controller 18, discussed below. The media library system may also be an optical disk library as discussed in the incorporated U.S. Pat. Nos. 4,974,156 and 4,945,428.

Each host processor 10 includes known electronic circuits and computer programs for computation and data processing system control, such as the application program 90. One such program may be represented by an IBM program product called Data Facility Storage Management Subsystem/Multiple Virtual Storage (DFSMS/MVS) providing migration and backup of data storage from a first hierarchical level of data storage to a second level. Preferably the second level includes the media storage units 20, as shown in FIG. 3. The DFSMS/MVS program product sends messages to the media library 16 for the retrieval of the data from media storage units included in the media storage units 20.

Program modules are included, as shown in FIG. 3, in a library manager controller 18 of the library 16 for incorporating the practice of the present invention. The library manager controller 18 controls the operation of the library 16 by interfacing with the host processor 10, the control units 12, and the PDSDs 14 to alert an operator to perform required actions in the library 16. An operator relies on management instructions from the library manager controller 18 to administer access to cartridges (not shown) from one or more media storage units 20, mounting and demounting of cartridges from PDSDs 14, and cleaning of PDSDs 14. Each storage unit 20 includes a tape or disk medium contained in a casing, such as a cassette or cartridge.

An operating system 88, such as the IBM Multiple Virtual Storage (MVS) software product, manages all program modules in the host 10. A command module 26 in the host 10 is a program task which receives software commands from other programs, for example, an application program 90 such as the DFSMS/MVS program in the host processor 10. Such commands are decoded and transferred to a control task module 28. The control task module 28 implements the logic for determining when data is to be retrieved from the media library 16. The data to be retrieved is processed in process module 30 and directed out to an I/O control module 32 to one of the control units 12. The control unit 12, in turn, passes the request to the media library 16. The library manager controller 18 uses the request to alert an operator according to the present invention. An operator is alerted on an operator display 25, and more particularly on screen 29, and may respond through an operator input device 23, such as a keyboard 22 or a mouse 27. Thus, a librarian workstation 15 is provided as an integral part of the manual data storage library 16. The librarian workstation 15 includes the library manager controller 18, the operator display 25, and the operator input device 23.

The library manager controller 18 includes input/output interface logic 64, a program memory 62 (e.g., random access memory) and a central processing unit 60 (e.g. a conventional microprocessor for a personal computer). It should be evident to those skilled in the art that a central processing means could include a plurality of central processing units. The library controller 18 further includes an operating system 63 and a set of code modules loaded on program memory 62. The code modules include library manager code 70, host interface logic 72, external device interface logic 76 and graphical user interface logic, device drivers 78, all loaded in program memory. The library controller 18 also includes at least one read/write storage device 80 (e.g., a hard disk) on which is stored a library management database 82.

Figure 4:
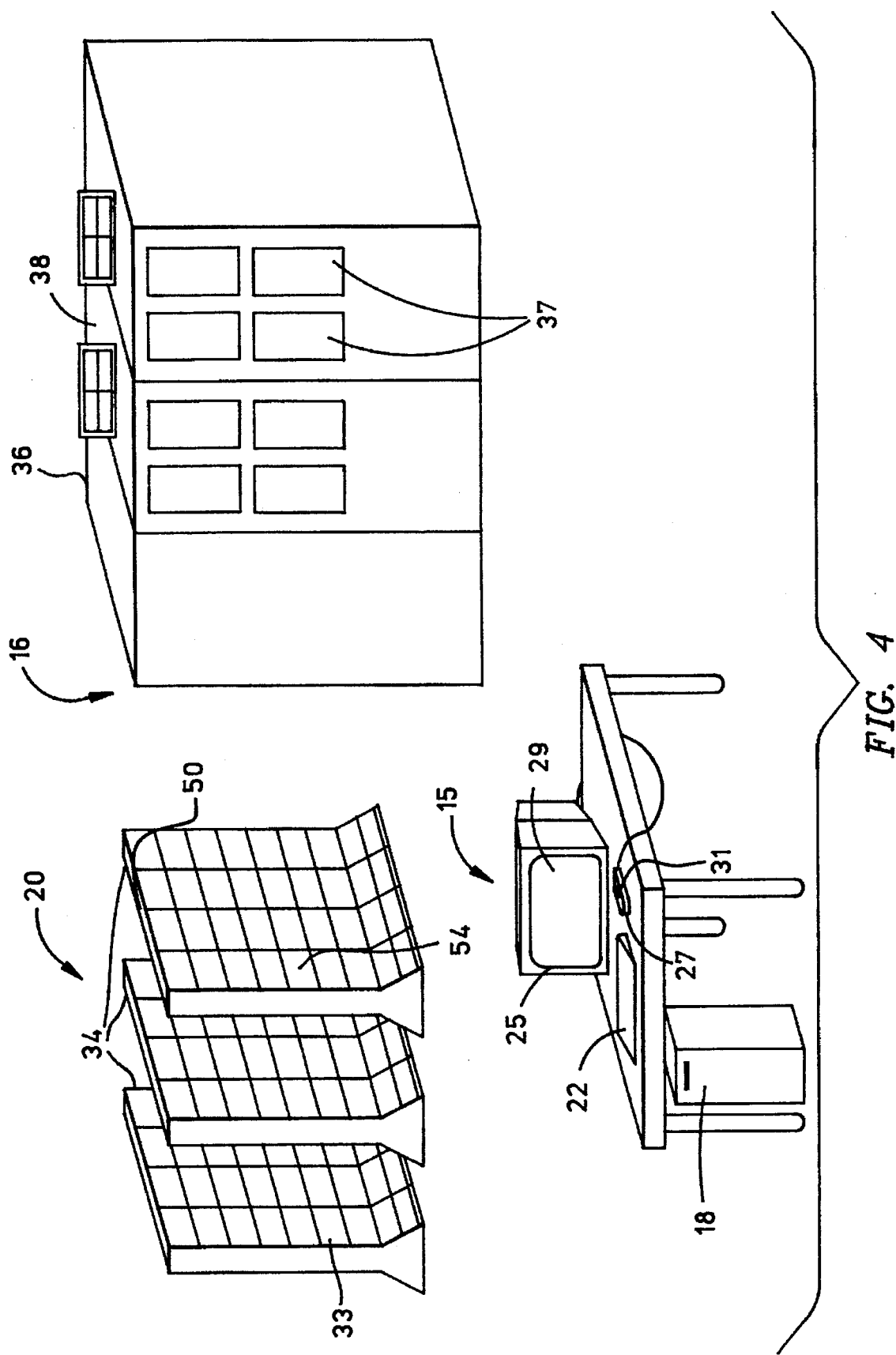
FIG. 4 is a preferred embodiment of a perspective view of an improved manual data storage library useful with the present invention.

FIG. 4 shows a manual data storage cartridge library which is usable as the media library 16 of FIG. 3. It should be evident that many different types of media may be stored in the library 16. In the embodiment shown in FIG. 4, individual spools of magnetic tape (not shown) are housed in plastic cartridges for protecting and handling magnetic tape. Such plastic cartridges are well known in the art.

The library 16 includes a media storage unit 20, shown as a plurality of modules 34, each having a plurality of magazine holders (not shown). Each magazine holder in the module 34 includes a plurality of storage bins 33, each storage bin 33 storing a magnetic tape cartridge (not shown) therein. Each cartridge is located in a manual library by designating large groupings as vaults, such as vault 50 and rows as racks, such as rack 54. The library 16 also includes several recorder/reproducer units (not shown), each of which may include, for example, an IBM 3490 magnetic tape system having a tape controller 36 and tape subsystem 38 containing at least one tape drive 37. An example of a tape drive usable as tape drive 37 is shown in the incorporated U.S. Pat. No. 4,339,936. Operation of the controller 36 and the tape drive 37 is discussed in the incorporated U.S. Pat. No. 4,435,762. The librarian workstation 15 comprises display 25, keyboard 22, mouse 27, and controller 18.

Methods of cataloging data in a data storage library are known in the art. For the sake of completeness, one type of method, in a tape library, is now described. Volume serial numbers serve to identify a cartridge or cassette in library 16. The volume serial numbers are called volsers. The volume serial numbers identifying a cartridge or cassette on which a requested data set resides may be coded on a data definition statement in a job control language. Alternatively, the tape data set may be catalogued in the system catalog. The volsers are used to identify whether the volume is located in storage or is currently mounted as disclosed in the incorporated U.S. Pat. No. 4,974,156. Further, the volser may be stored on tape in the cartridge in a data format which is read upon mounting of the cartridge in a drive.

Referring again to FIG. 3, display 25 is used to present one or more graphical user interface (GUI) windows (not shown in FIG. 3) on the screen 29 to an operator. In a preferred embodiment the GUI 21 presents messages on the screen 29 that are intuitive to an operator and are presented without the inherent clutter of the prior art system discussed above. Thus, a new operator will be enabled to learn faster and to quickly become proficient.

Similar types of grouped events, e.g., mounting cartridges and mount error messages, are preferably presented on one window. Such a window, in a preferred embodiment is called an "Action List" (shown in FIG. 5, and discussed in more detail below). Thus, the invention provides an operator with a graphical pointer on the screen 29 to a correct field in order to facilitate the operator's understanding and completion of his task. The invention also points an operator to the correct position for sending confirmation of actions messages to the library manager code 70. The library manager code 70, in turn sends such confirmation to host 10, and then updates database 82 on hard disk 80. Using the mouse 27, an operator may select a predetermined event (e.g., scheduling cleaning of a tape drive 37) by "clicking" on a defined graphical field (not shown in FIG. 3) presented on screen 29. "Clicking" is a term understood in the art; however, for the sake of clarity, "clicking" refers to moving a graphical pointer (not shown) produced by the mouse driver software to a graphical user interaction field on screen 29 and pressing button 31. Some events trigger messages which an operator performs without having to click on a graphical field. Thus, the present invention enables an operator to perform as reliably as a robot in an automatic data storage library while not requiring the conversion to a fully automated system. Also, an operator avoids having to wade through a vast quantity of confusing text based messages and may communicate with the tape drives 37 through the GUI 21.

The library manager controller 18 interfaces directly with at least one of the control units 12, as shown in FIG. 3. In a preferred embodiment, the library manager controller 18 is a special model IBM PS/2 running the OS/2 operating system with special application program code, as described above. Preferably, the host control unit interface logic 72 and the external device interface logic 72 are written as OS/2 Application Program Interfaces (APIs) and therefore obey OS/2 protocols. Also, in a preferred embodiment, the library manager code 70 is written in the C programming language, and uses the IBM C/2 compiler. As shown in FIG. 3, the control units 12 are in direct communication with the PDSD subsystem 17 and thus with the PDSDs 14. Preferably, the PDSD subsystem 17 is a tape subsystem, such as the subsystem 38 and the PDSDs 14, include tape drives 37. In the preferred embodiment, the host processor 10 manages up to four tape subsystems 38 and their associated volumes as a logical set. The library manager controller 18 gathers all communications from the host processor 10 provided through the I/O control module 32 which are relevant to the tape subsystem 38 and intended for operator action and processes them for presentation on the display 25 in the form of messages. The library manager controller 18 provides for the display of mount and eject messages. The present invention brings the benefits of a graphical interface to an operator station and thus significantly reduces the quantity of messages while improving the quality of the information provided. In addition, because the present invention is an integral component and extension of library 16, events associated with tape handling that previously could only be construed from disjoint events (e.g. the completion of a rewind-unload request) can now be presented to the logic 72 in the form of, for example, an Application Program Interface (API) for automatic notification to an operator.

The inclusion of the Application Programming Interface (API) that is enabled by this invention provides for a significant advance and simplification in the management of communications for an operator regarding device status in a data library. An API is a formally defined programming language interface between a system control program or an application program and the program user. The technique of using an API as a communications interface management tool eliminates the need for alien so-called "snooper programs". Further, by removing the communications interface from the host environment and placing it in a module format, a protective isolation is made to prevent host system outage caused by snooper programs. The modularity of the API allows easy debug of communications interface problems.

Figure 5:
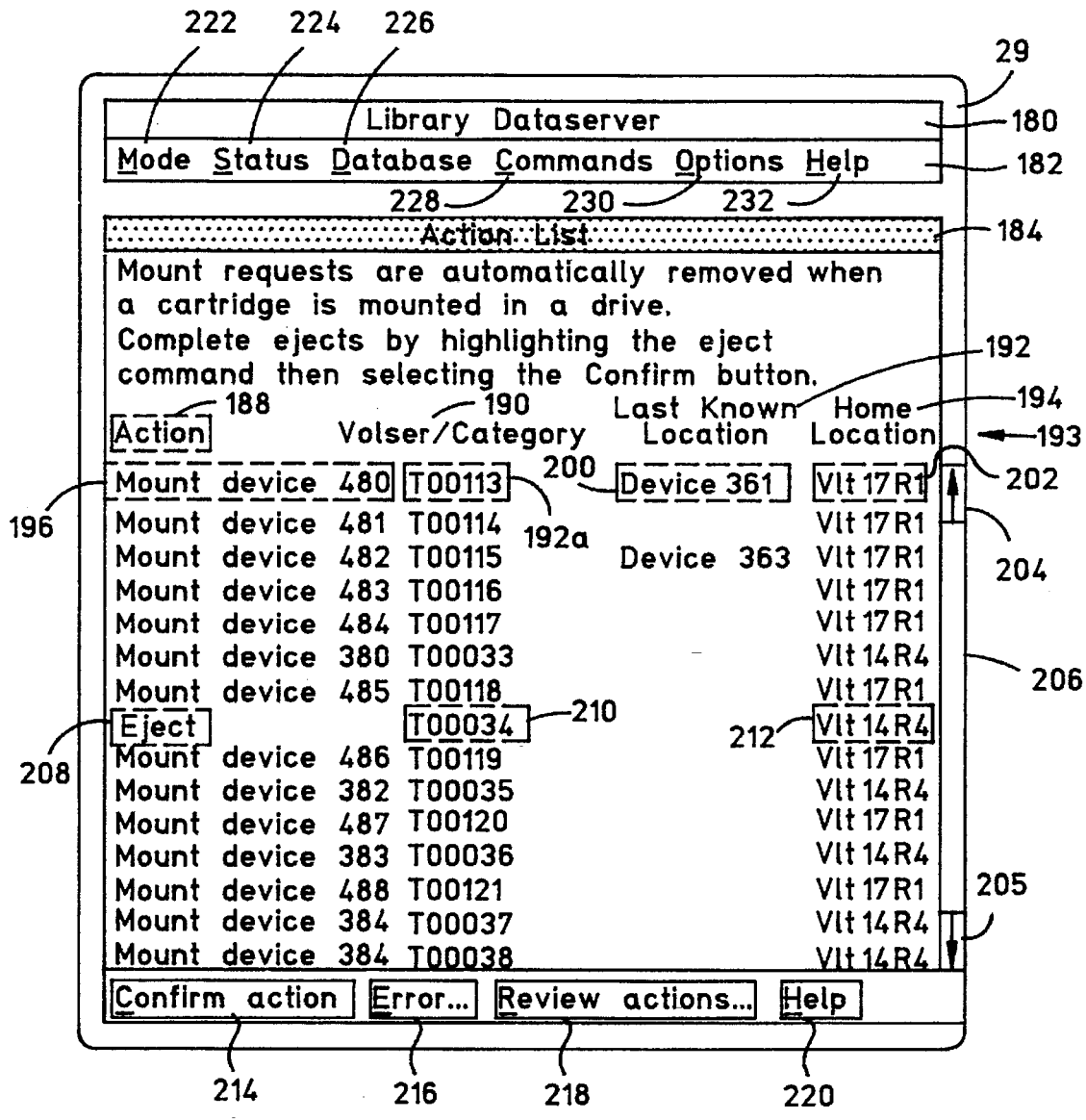
FIG. 5 is a representation of an operator interface window useful with the present invention.

An example of a window presented by a graphical user interface is shown in FIG. 5. Preferably, the main title bar 180 and the main window action bar 182 will always appear on screen 29, as long as library controller 18 is powered up. The main menu action bar 182 includes main menu action buttons, 222, 224, 226, 228, 230, and 232. The buttons are graphical user interaction fields since an operator may interact with the software by "clicking" on the area displayed on the screen which appear to be buttons. It should be understood, that any area on screen 29, with which an operator interacts may include a graphical user interaction field. In the managed manual mode of the present invention, an interactive "Action List" window 193 is preferably always displayed on screen 29 to an operator. The "Action List" window 193 presents library tasks for the operator to perform. Actions should preferably be performed in the sequence listed. Preferably, a window title bar 184, entitled "Action List", identifies the specific task of any window appearing on screen 29. Work window action buttons, "Confirm Action" 214, "Error" 216, "Review Actions" 218, and "Help" 220 appear at the bottom of action list window 193.

In the preferred embodiment, the "Confirm Action" button 214 is used by an operator to confirm that a highlighted action has been completed. Such an action may be a required action of demounting a cartridge from a PDSD and ejecting it from the library. For example, a required operator action is identified in the column defined by field 188, denoted as "Action". An example is shown in the same figure, an action to eject a cartridge is shown at field 208, as "Eject", indicating that the operator is to eject a cartridge from the library. The term eject defines the action of logically removing a cartridge from the control of the library manager code, and then physically moving it from the library's shelves to some other location, specified or unspecified. The specific cartridge to be ejected is identified in the column identified by the field 190, as "Volser/Category". In the example shown, the data displayed at field 210 informs the operator that the cartridge having "Volser T00034" is the cartridge to eject from device 381. A column of information is also identified by field 194 as a "Home Location". The home location identifies where the ejected cartridge is currently stored. For example, field 212 identifies the location for storing the cartridge to be ejected as being "VLT 14 R4". In this example, "VLT" designates a vault or storage room and "R" designates a storage rack located within a vault. Thus, in the example shown, the operator is instructed to retrieve the cartridge having volser T00O34 in vault 14 on storage rack 4 and send it out of the library. Once the cartridge is ejected, the operator may use the "Confirm Action" button identified on the displayed field 214, by moving a mouse pointer graphic to field 214 and "clicking" mouse button 31. Alternatively, in the example shown, the operator may confirm that the action has been completed by typing the letter "C", while the action list is displayed. Note that the letter "C" is shown underscored in displayed field 214. In this example, of the preferred embodiment, the letter "C" is referred to as an action letter, because the typing and entering of the letter will activate the "Confirm Action" button. Upon pressing the "Confirm Action" button, the library manager code 70 automatically updates the library manager database 82 stored on hard disk 80.

In the preferred embodiment, it is not necessary for an operator to use the "Confirm Action" button to confirm that a mounting of a cartridge has been completed, because the library manager code 70 is automatically notified by control unit 12 after a mount is completed. The library manager code then tells the control unit to notify the host 10 that the mount is completed. However, the action list window is used to notify the operator of the need to mount a cartridge on a particular device. For example, as in the above example, an operator action is indicated in the column defined by display field 188 entitled "Action". In the example shown, a displayed field 196 indicates, "Mount device 480". A column identified by a displayed field 190, indicates, "Volser/Category". In the example shown, a displayed field 192a indicates that the volser for the cartridge to be mounted on the device 480 is "T00113". A displayed field 200, in the column defined by the field 192, as "Last Known Location" (of the cartridge), indicates that the cartridge having volser "T00113" was last recorded by the library manager code 70 in the library manager database 82, as being loaded in "device 361". It may still be in the eject hopper of the device or it may have been returned to the home location.

Preferably, allowances are made by the present invention for various foreseeable situations. For example, in case the requested volume has been returned to its normal storage location denoted in the column defined by field 194 as "Home Location", the operator is directed to that location on the screen 29 of the display 25. For example, the home location of the cartridge having volser T00113 is denoted at field 202 as "VLT 17 R1". This signifies to the operator that the cartridge is located in vault 17 in rack 1. Upon loading the cartridge having volser T00113 in device 480, the volser stored as data on the tape is read. The tape device sends a message to the control unit 12, which in turn sends a message to the library manager code 70. The library manager then notifies the control unit to send a message to the host 10, and the mount action is automatically removed from the action list. The library manager code 70 then updates the database 82 on the hard drive 80 to indicate the new location of the cartridge of volser T00113 and the status of the device 480. This database may be read by the hosts.

Figure 6:
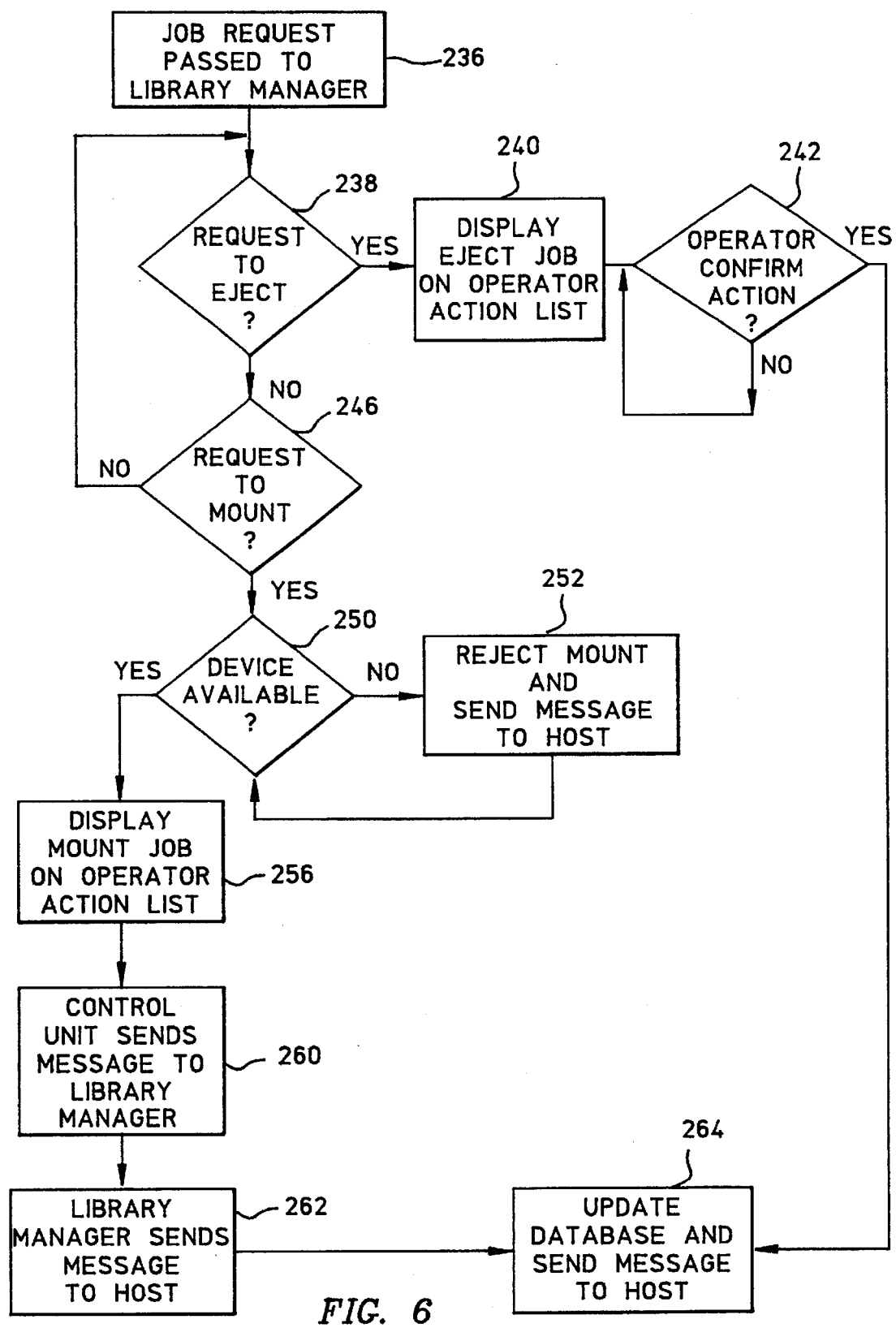
FIG. 6 is a flow diagram for alerting an operator to mount and eject at least one data volume in the present invention.

The process of managing, mounting, demounting and ejecting of cartridges in the preferred embodiment of the present invention is shown in FIG. 6.

The specific example above may be generalized in the steps shown in FIG. 6. Reference to the examples above in FIG. 5 will help clarify these steps. Additionally, steps not covered in the specific example of FIG. 5 will be covered in the following generalized steps. In step 236, the host passes a job request to library manager code 70. The library manager code checks to see whether this is a request to eject, in step 238. If the response is affirmative, then the library manager code 70 displays an eject request on the operator action list, as shown in step 240. An operator will be prompted to confirm his action, as shown in step 242. After confirmation, the library manager code 70 updates the library manager database 82, as shown in step 264, and notifies the host. Returning to step 238, if the job is not a request to eject then the library manager code 70 checks to see if this is a request to mount, as shown in step 246. If this is a request to mount, then the host determines which device to use.

The library manager code 70 checks device status by analyzing the data stored on the library manager database stored on read/write storage device 80. The library manager code 70 checks to see if the host-specified device is available. If it is not available, then the mount request is rejected and the host notified, as shown in step 252. However, if the device is ready, then the library manager code 70 displays a mount job on the operator action list as shown in step 256. When a volser is mounted the control unit sends a message to the library manager code. The library manager code 70 then sends a message to the host 10, as shown in step 262. The host is notified that the mount is completed. The host, upon notification, reads the volser that is stored as data on the tape. If the wrong volser has been mounted, the host issues a demount job and then reissues a mount job, starting from step 236. The library manager code 70 updates the library manager database 82, as shown in step 264.

Figure 7:
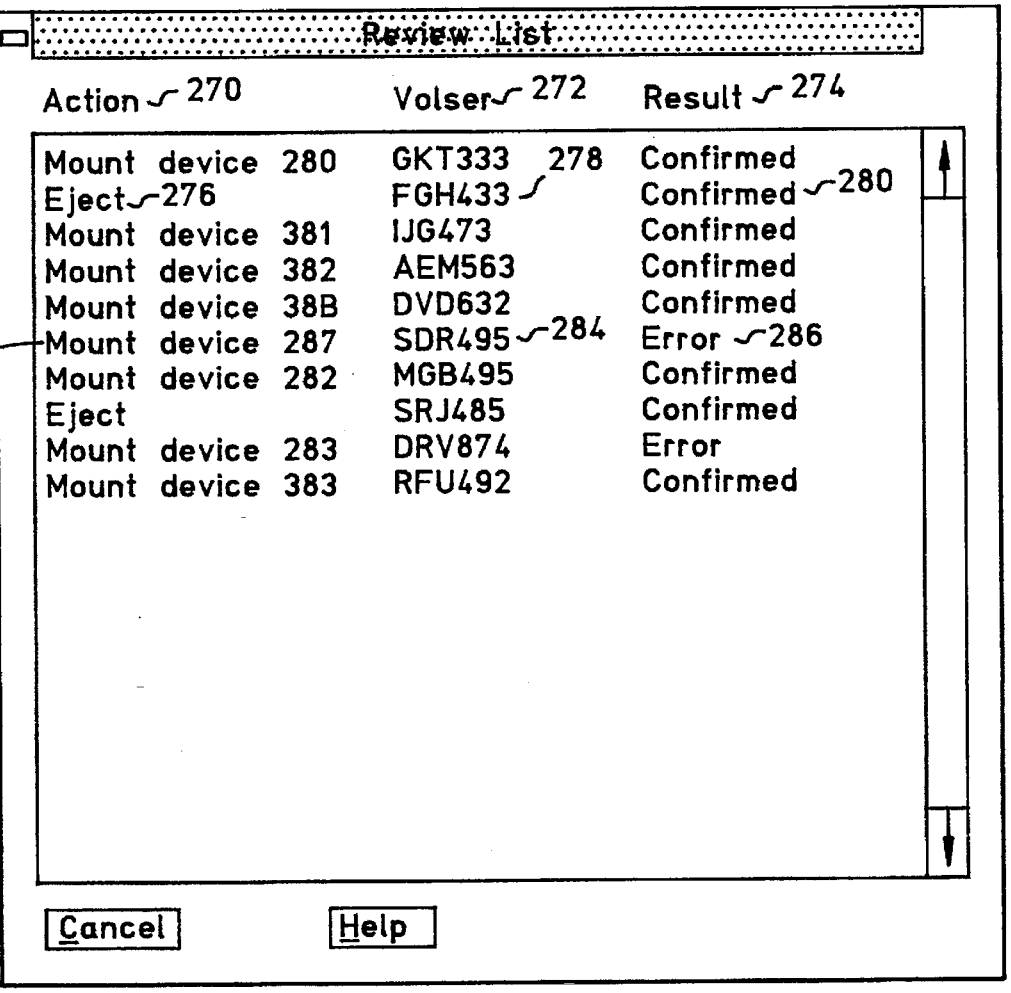
FIGS. 7, 8 and 9 are further representations of operator interface windows useful with the present invention.

In a preferred embodiment, provisions are made so that the operator, after having performed actions identified on the "Action List" window 193, may check his actions in an operator review list, as shown in FIG. 7. Note in the preferred embodiment that the "Review Actions" window is reached by an operator clicking on the "Review Actions" work window action button 218 in the "Action List" window 193. In the example shown, the field 270 defines a column denoted as "Action". The field 272 defines a column as "Volser". The field 274 defines a column denoted as "Result". In this example, it can be seen at field 276, that an action to eject is denoted. The action involves volser FGH433, as shown in field 278. The results of this action are shown in field 280, as having been "Confirmed". An example of an error condition is shown denoted in field 286, for the action, shown in field 282, to "Mount Device 287". The "device 287", is shown as intended for mounting with volser "SDR495", as shown in field 284.

Figure 8:
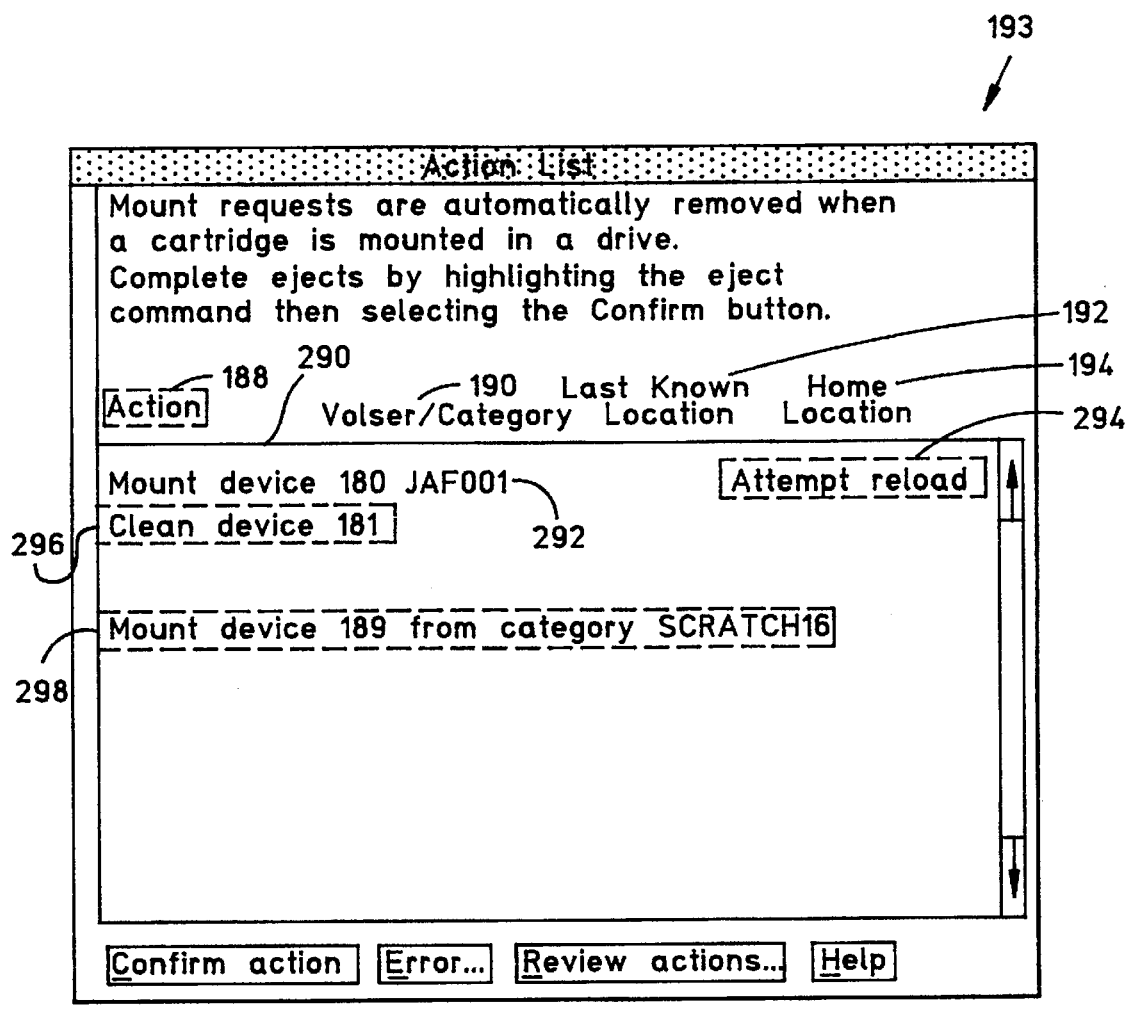

Reference to FIG. 8 shows an example "Action List" after an error has occurred, in a preferred embodiment of the present invention. It should be noted that the "Action List" window 193, presented in FIG. 8, is identical to the example "Action List" window presented in FIG. 6, except for specific operator messages. In particular, the operator action shown to be required is to "Mount device 180", as shown in field 290. The cartridge requested to be mounted is "JAF001", as shown in field 292. The graphical interface shows the operator that an error has occurred in field 294. Thus, in the example shown, the operator is requested to "attempt reload" of device 180.

Figure 9:
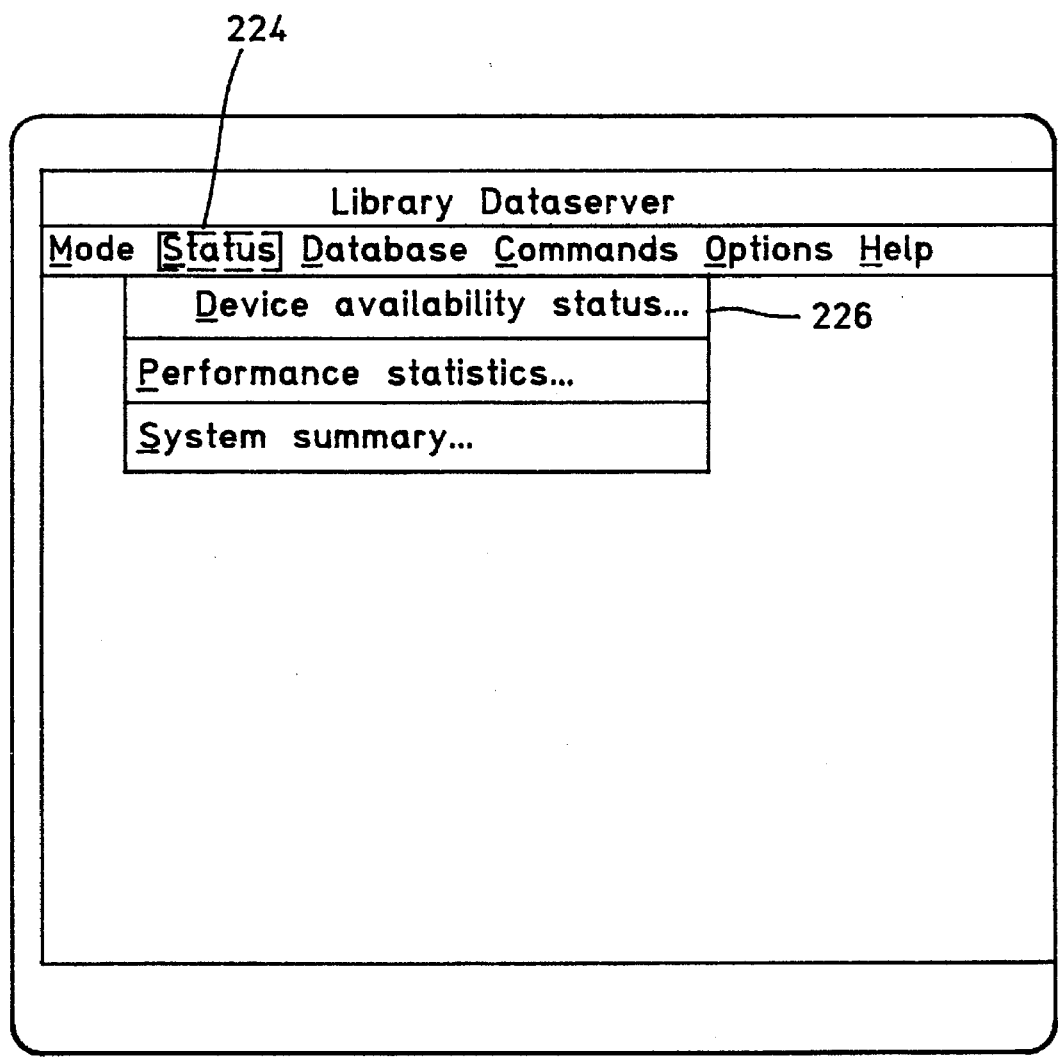
Figure 10:
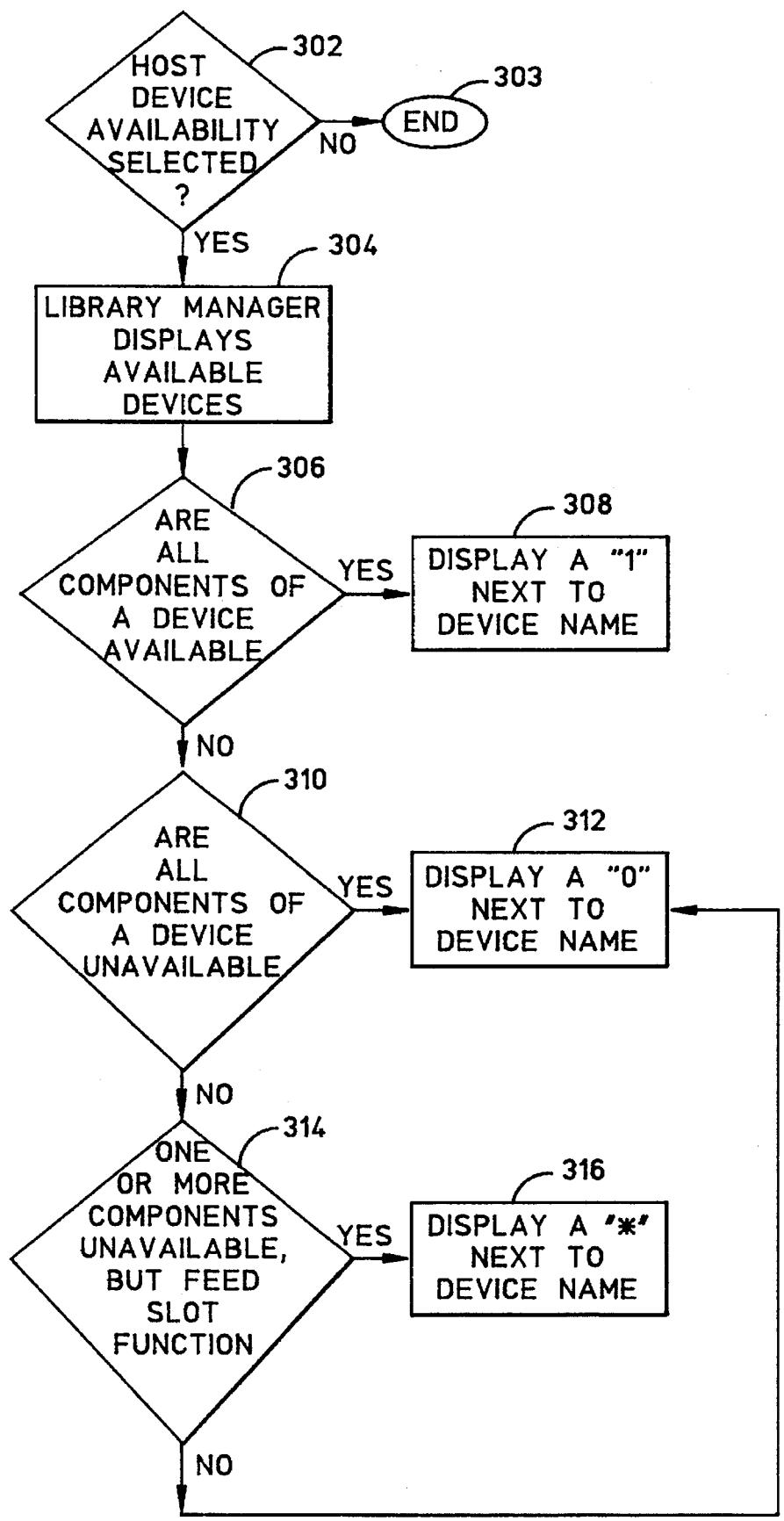
FIG. 10 is a flow diagram for allowing an operator to check availability of devices, including PDSDs, in the present invention.

Referring to FIGS. 9 and 10, operator intervention tools, provided in the preferred embodiment of the present invention, are shown. Using the present invention, the operator may intervene in several ways. For example, the operator may check device availability status as shown in FIG. 9. In the preferred embodiment, the operator may use the mouse 27 to click on the main window action button 224, denoted as "Status". Then, the operator may click on pull-down menu selection 226, denoted as "Device availability status". The steps performed by library manager code 70, when host device availability is selected, are shown in FIG. 10. In step 302, library manager code 70 checks to see if host device availability has been selected by an operator. If the answer is "no", processing ends as shown in step 303. If the answer is "yes", library manager code 70 displays all available devices, as shown in step 304. Next, the library manager code 70 checks to see if all components of a device are available, as shown in step 306. In the preferred embodiment the library manager code displays a character, such as a "1", next to the device name to indicate all components of a device are available, as shown in step 308. If all components of the device are not available, library manager code 70 checks to see if all components of the device are unavailable. If the answer is "yes", then the library manager code displays a character, such as a "0", next to the device name, as shown in step 312. If all components of the device are not unavailable then library manager code 70 checks to see if one or more components are unavailable, but the feed slot is functioning on the device, as shown in step 314. If the answer is "yes", then a character showing a degraded status, such as an "*", is placed next to the device name. If the answer to that inquiry, in step 314, is "no" then processing returns to step 312 as a completion step.

Figure 11:
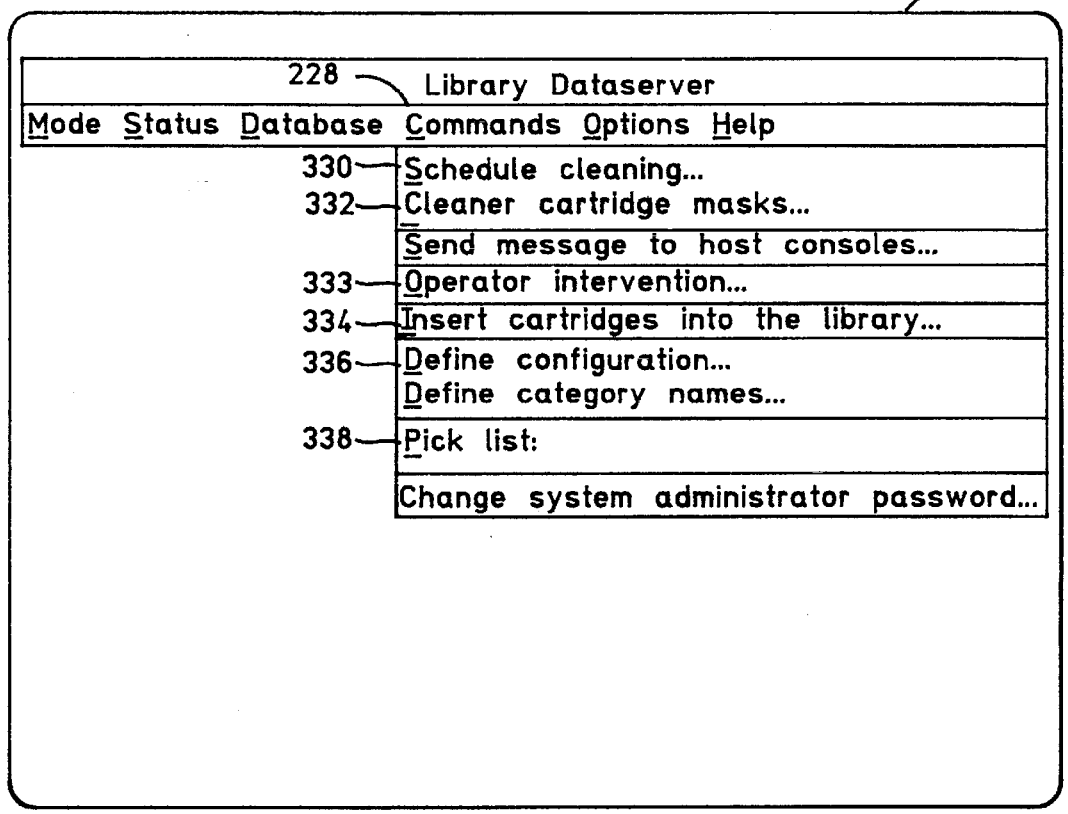
FIGS. 11, 12, 13, 14 and 15 are representations of operator interface windows useful with the present invention.

Referring to FIG. 11, if an operator selects a main window action button "Commands" 228 several selections on a pull down menu are made available. One particular selection, operator intervention, shown in field 333, allows for error correction. In the preferred embodiment, the operator intervention window presents error conditions and their solutions. For example, a load/unload failure on a particular device may be described to the operator which means that the device must be emptied and feed slot checked. Other operator intervention conditions which may be listed in the preferred embodiment, may include library capacity exceeded. Such an error message would require the operator to eject cartridges from the library 16. Examples of such solutions presented on the screen 29 are not illustrated.

Once again, referring to FIG. 3, the library manager code 70 communicates through external device interface logic 76, in the form of an API for example, to external devices 66. The device drive code 78 drives external devices 66 and a hardware interface is provided by I/O interface 64. An example of external devices 66 may be an input device, for example a laser scanner 67 for reading bar code labels containing volsers on tape cartridges, or it may be an output device such as a large message display panel of the type commonly used in manual data storage libraries to aid operators. In a preferred embodiment, logic 76 may be used to accept input data from a device 66, such as the scanner 67, in order to present this data through windows presented by GUI 21 on display 25 to an operator. Alternatively, an output device such as the large message display panel 68 may be used to access and display data stored by library manager 70 in the database 82 on the hard disk 80. Access to the read/write storage device 80 is gained through external device interface logic 76.

Thus, another advantage of the present invention is made possible by the host interface logic 72 and external device interface logic 76. That advantage is that volume serial numbers for cataloging purposes may be inserted into the library from three sources: (1) host processor 10 can download a volume serial list to library manager code 70 to place in database 82, (2) an operator may enter volume serial numbers by using windows presented by GUI 21, and interface logic 76 allows external device 66, for example a bar code scanner to insert volume serial numbers, in a similar fashion to the host.

Figure 12:
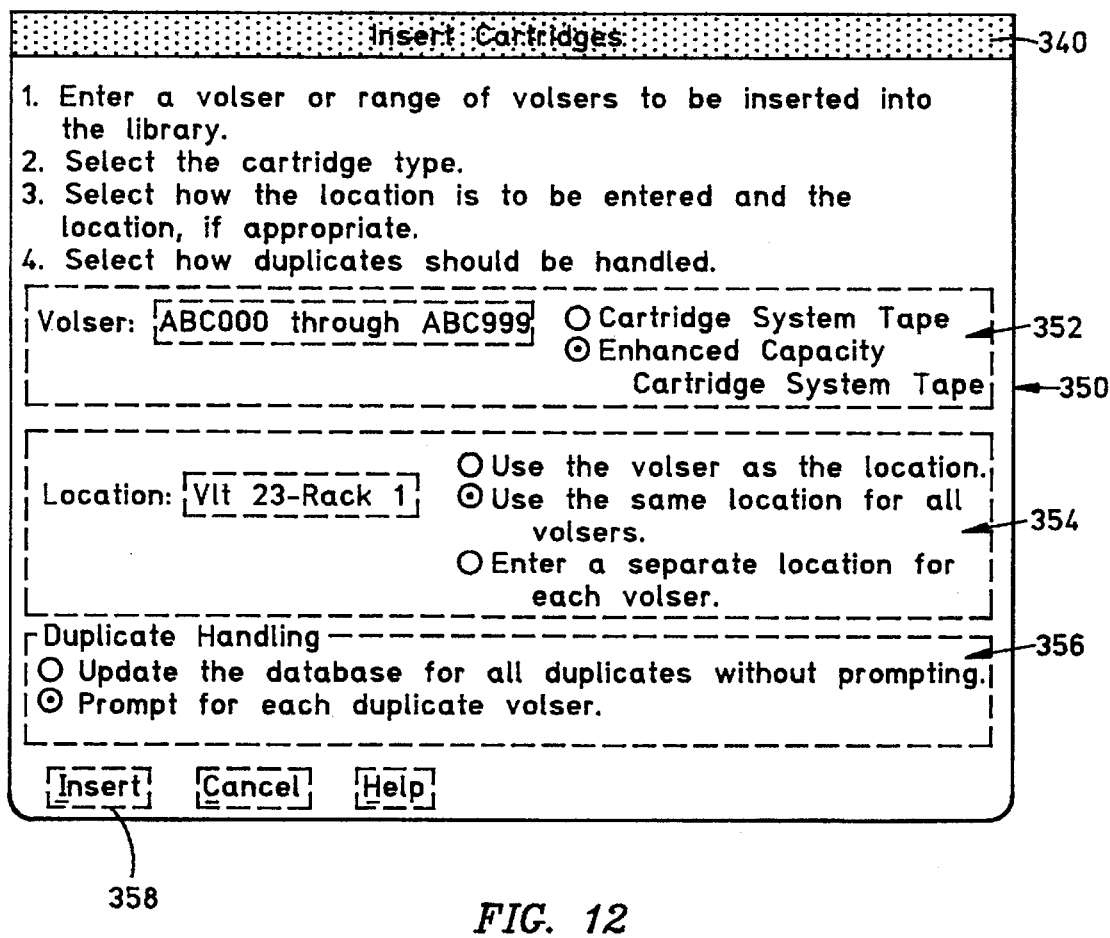

Referring again to FIG. 11, the main menu action bar is shown. An operator using mouse 27 to click on main window action button "Commands" 228 is presented with a pull-down menu of selections presented on screen 29 by graphical user interface 21. Clicking on "Insert cartridges into the library" pull-down menu selection 334 allows the operator to insert cartridge volume serial numbers into library manager database 82. Referring to FIG. 12, an operator is presented insert cartridges window 350. Window title bar 340, identifies the window shown as the "Insert Cartridges" window. In this example, menu selection box 352 allows the operator to select a range of volume serial numbers to be inserted to the library 16. Further, an operator may select a location for the volume serial numbers, as shown in menu selection box 354. An operator may handle duplicate volsers by selections available in menu selection box 356. Clicking on window action button "Insert" 358, will allow the operator to complete the insert cartridge action. The inserted cartridges are inserted by library manager code 70 to the library database 82. Also, error correction may be handled automatically by library manager code 70 based on data received by an operator's input. For example, when an operator enters the volser number for a cartridge, noted previously as being misplaced, for example in menu selection box 352, the library manager code 70 recognizes that the volser exists in database 82 and has its misplaced flag set. Then library manager code 70 updates database 82 by clearing the misplaced flag. Conveniently, once cartridges are inserted into the database in this manner, they are available for use by host 10 or external devices 66.

Figure 13:
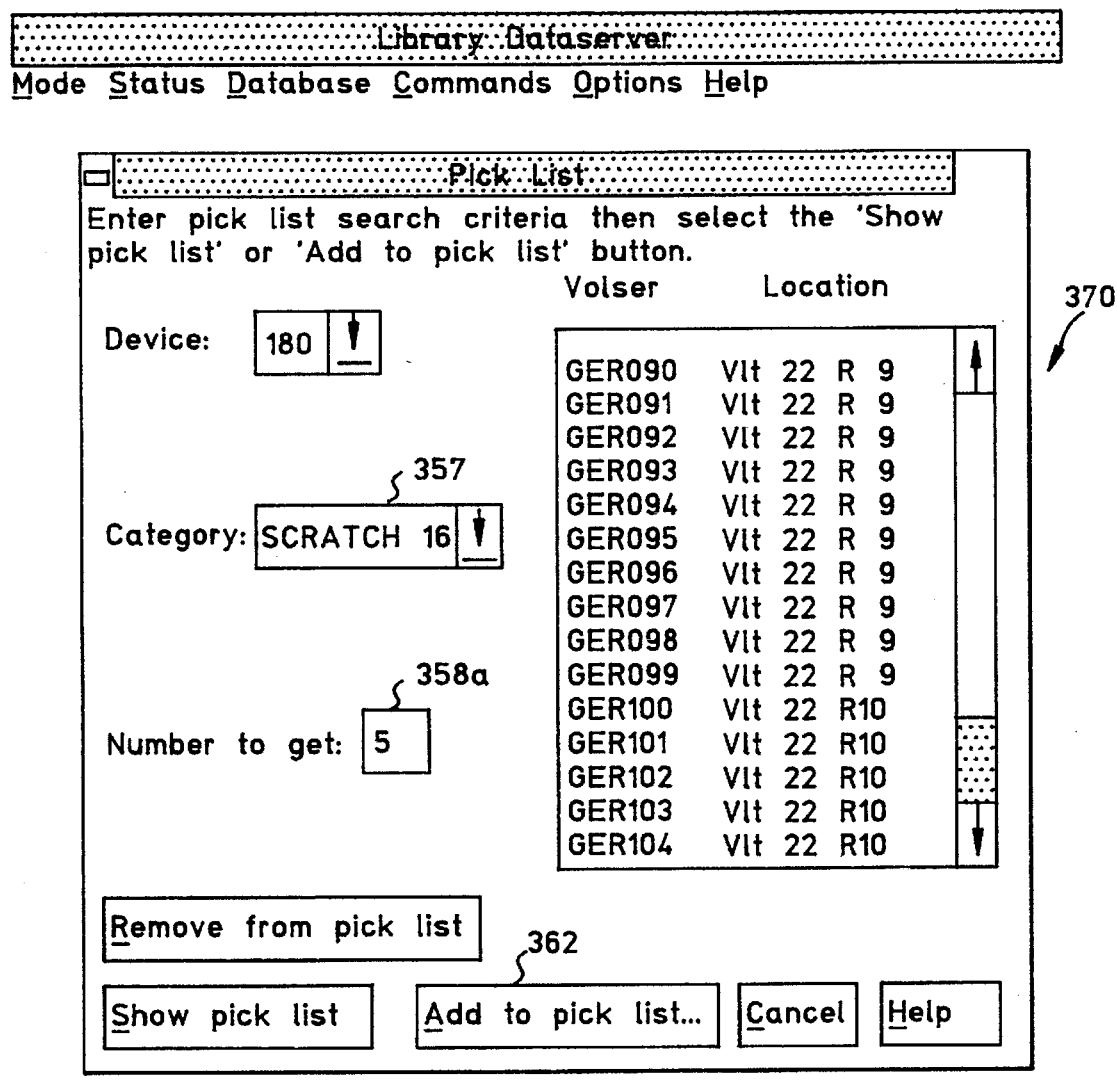

The library manager control code 70 maintains the inventory of volume serial numbers associated with library 16. It also maintains category information for each volume serial number. A category is defined by an operator to identify a grouping of volumes that have a common attribute, such as volumes to eject, volumes newly added to the library, and so forth. Using windows presented by GUI 21, an operator can request library manager code 70 to provide a list of cartridges on display 25 to pick from based on a particular category. This "Pick List" is accessible from windows presented by GUI 21, as shown in FIG. 13.

Figure 14:
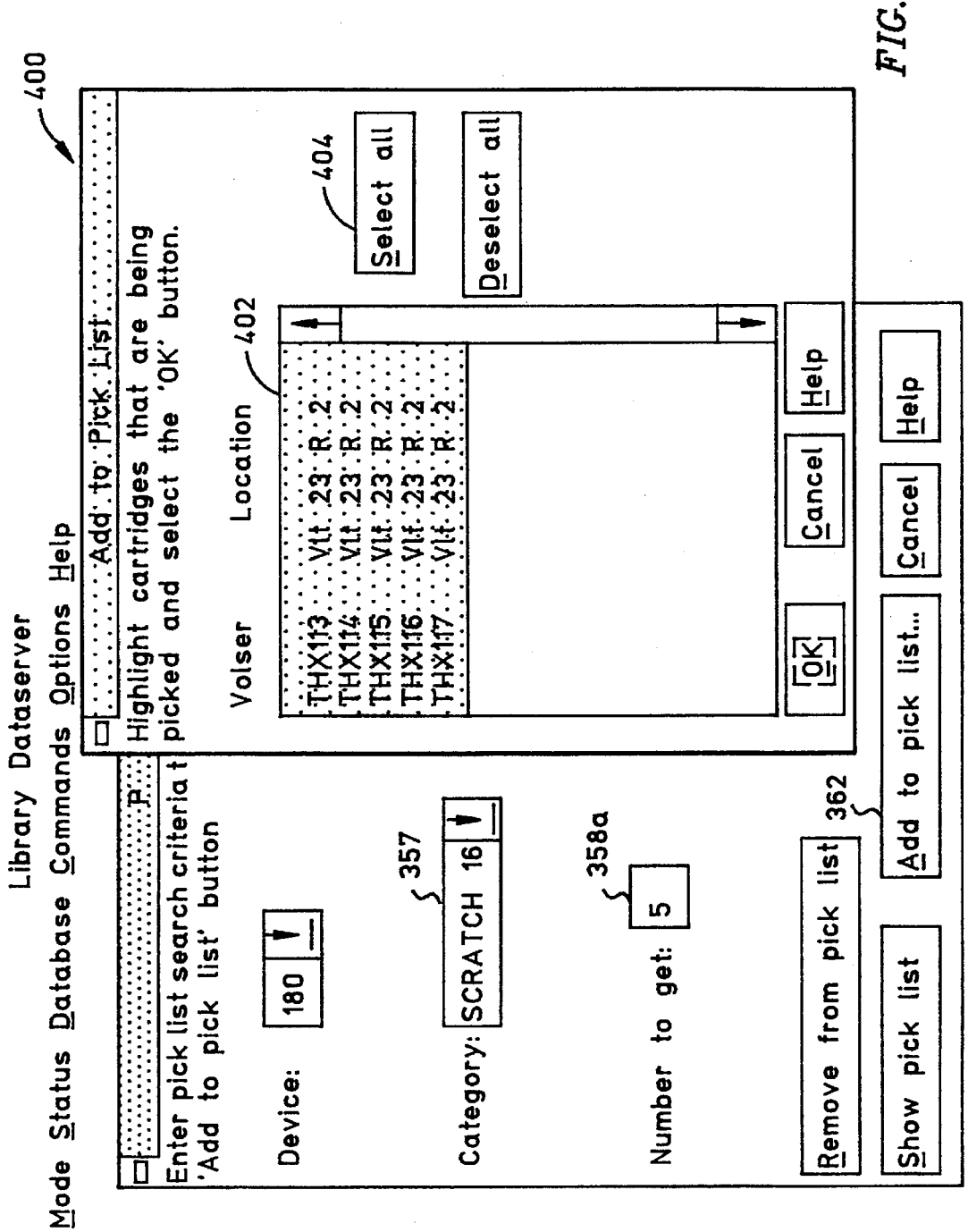

Reference to FIGS. 11 and 14 will help to illustrate the use of categories. Referring again to FIG. 11, category names may be defined in pull-down menu selection, "Define category names" 336. A pull-down menu selection, "Pick List" 338 is available for picking cartridges based on categories. Such a "Pick List" is shown in FIG. 13. Pick list window 370 contains various operator selection fields, such as "Category" field 357, and "Number to get" field 358. For example, "Category" field 357 shows "Scratch 16" as the selected category. An operator has selected, in the illustrated example, a number of volumes to get as five, as shown in field 358. Further, an operator has selected, in the illustrated example, a location mask as "VLT 23*", indicating vault 23 and any rack. Selection of window action "Add to pick list" button 362 brings up the "Add to pick list" window shown in FIG. 14. Note that in the example illustrated in FIG. 14, five volumes with location VLT are shown in highlighted field 402. An operator may select with mouse 27 the "Select all" action button 404 to select the displaced volsers for addition to the pick list. Thus, the present invention enables an operator to easily organize and simplify the task of library management.

Figure 15:
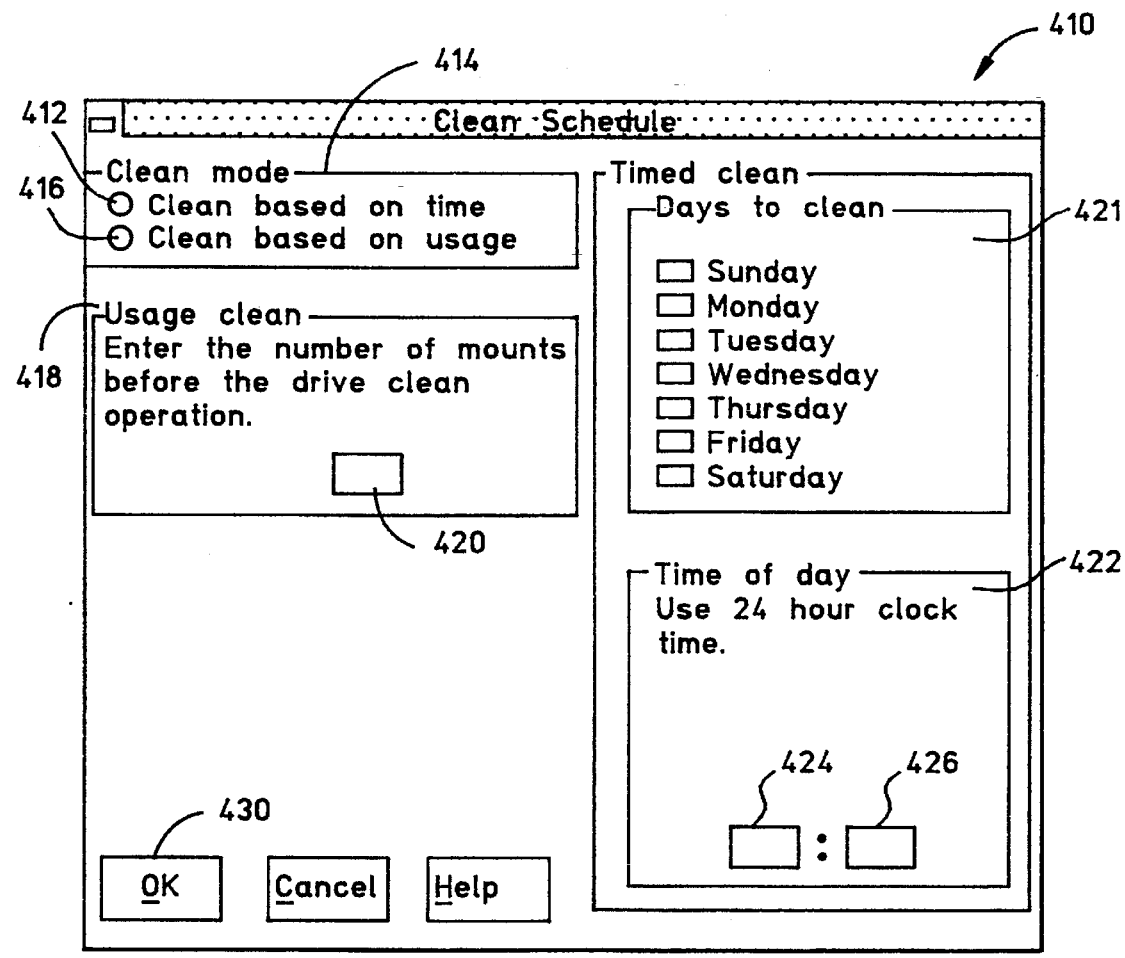

Another advantage of the present invention is the presentation of cleaning schedule windows. An example of a cleaning schedule window is shown in FIG. 15. An operator may select "Clean based on time" in display field 412 by clicking a mouse pointer on field 412. Or an operator may select "Clean based on usage" by clicking on field 416. If an operator selects "Clean based on usage", then field 420 may be used to enter the number of mounts before the drive clean operation. This is available in usage clean menu box 418. If an operator selects clean based on time then he may select the days on which to clean in menu box 421. Preferably, all seven days of the week are available. An operator may also select, in menu box 422, a 24 hour clock time in which to clean. Hours are available in field 424 and minutes available in 426. When the operator has completed his clean schedule the OK action button 430 is picked.

Figure 16:
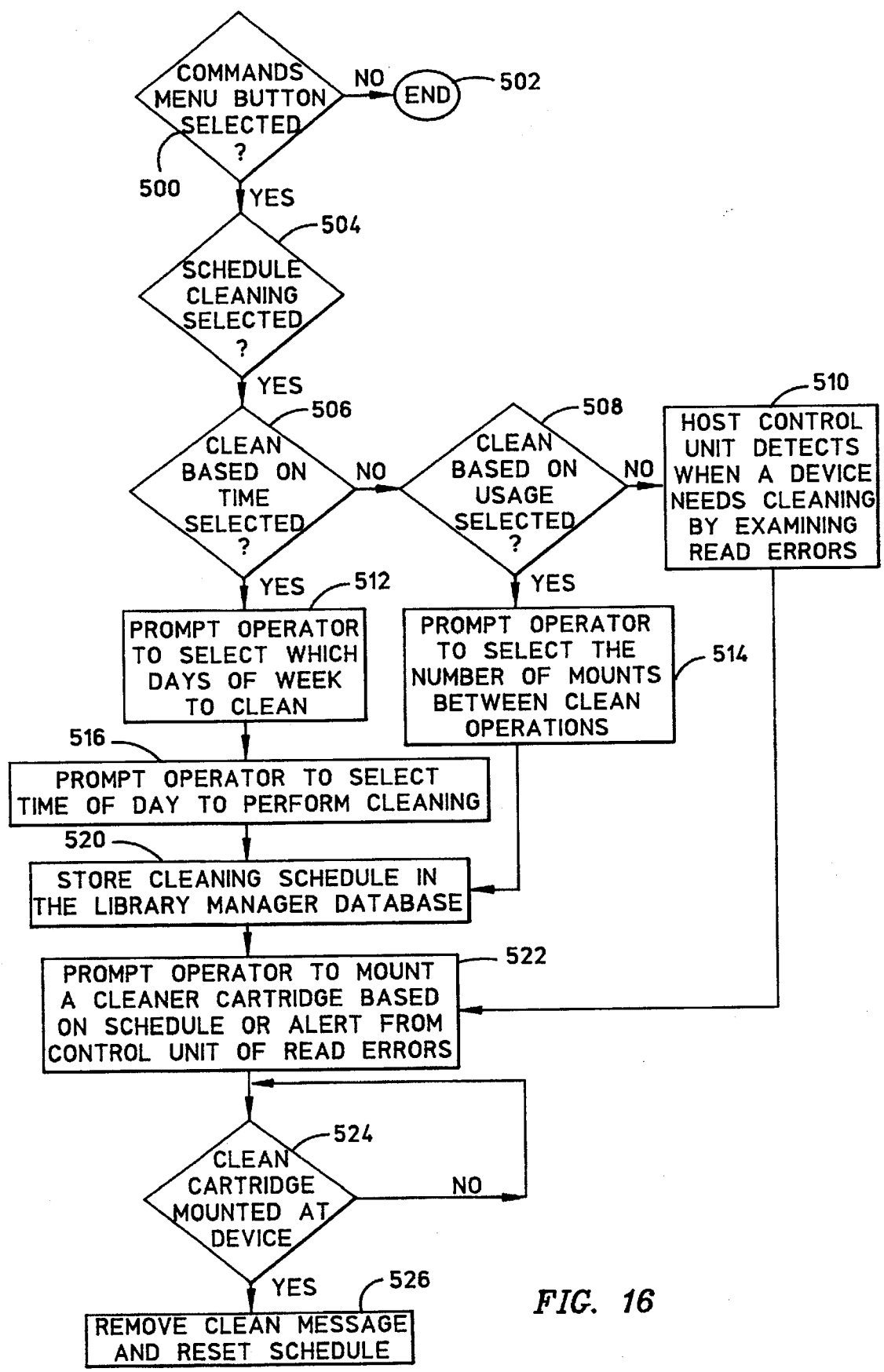
FIG. 16 is flow diagram for allowing an operator to schedule cleaning and of automatic cleaning alerts provided by the present invention.

A flow diagram representing the general selection of a cleaning method is detailed in FIG. 16. Box 500 shows that library management code 70 checks to see if the "Commands" menu action button 228 has been selected. If the answer is "no", processing ends in step 502. If the answer is "yes", library manager code 70 checks to see if schedule cleaning pull-down selection 330 has been selected, in step 504. If the answer is yes, library manager code 70 checks to see if clean based on time has been selected, as shown in step 506. If clean based on time has been selected, then the operator is prompted to select which days of the week to clean, in step 512. Next, in step 516, the operator is prompted to select the time of day to perform cleaning, in step 516. The cleaning schedule is stored in the library manager database, as shown in step 520. If, however, clean based on time was not selected, library manager code 70 checks to see if clean based on usage has been selected, in step 508. If the answer is "yes" the operator is prompted to select the number of mounts between clean operations, as shown in step 514. Then, in step 520, the cleaning schedule is stored in the library manager database. However, if cleaning was not based on usage or time, then as shown in step 510, an alternative is available in that the host control unit 12 will detect when a device needs cleaning by examining read errors. Thus, in step 522 an operator will be prompted to mount a cleaner cartridge based on schedule or an alert from control unit of read errors. Thus, library manager code 70 can provide a cleaning schedule through windows presented by GUI 21 to prompt an operator to mount a cleaner cartridge based on the schedule or use. This eliminates the need to keep track of drive cleaning by some means other than the library manager controller 18.

It should be noted a "Clean device" message would appear on an "Action list" window 193 as shown in field 296 of FIG. 8. The volser will be chosen from the available cleaning cartridges. Referring to FIG. 16, in step 524, if a cleaner cartridge is inserted in a device, then processing continues to step 526. In step 526, library manager code 70 removes the clean message from the "Action List" and resets the cleaning schedule. The clean device message will remain displayed until the cleaning cartridge is mounted, as shown in step 522. Thus, the present invention provides an automatic and convenient method for tracking cleaning in a manual storage library. The present invention provides host processor 10, tape subsystem 38, and a library manager controller 18 cooperating in an organized and structured framework which provides all of the aforementioned advantages. The framework provides an operator interface through GUI 21, presented on screen 29 of display 25, which is an integral component of library 16. An operator may interact by using input means 23. Further, the library manager code 70 is accessible through the interface logic 72 and 76 for communication with at least one PDSD through host 10, and external devices, such as an optical scanner 67 and a large message display panel 68.

Accordingly, an operator communications interface for managing a manual data storage library has been described. While various embodiments have been disclosed, it may be possible that many variations and alternative embodiments could be used by those skilled in the art, in view of the teachings herein. It is understood, therefore, that the invention is not to be in any way limited, except in accordance with the spirit of the appended claims and their equivalents.

What is claimed is:

1. In a manually operated data storage library requiring at least one operator, said library having a plurality of data storage bins, each data storage bin capable of storing one data storage medium therein, each data storage medium including at least one data volume, said library further having one or more peripheral data storage devices (PDSDs), each PDSD capable of having a data volume mounted therein, and said library also having a data path from said PDSDs to a host processing control means for controlling said PDSDs, a combination for managing said library comprising:

a library manager controller including program memory and a data path to said host processing control means, and further including host interface logic means for communicating with said host processing control means;

a display device having a screen and being connected to said library manager controller for alerting said operator of a task to transfer a data volume from a data storage bin to a PDSD and from a PDSD to a data storage bin;

graphical user interface means in said library manager controller for constructing graphical user interaction fields on said screen, said fields including an action list window visually presenting library tasks for performance by a human operator, each said library task being selected from a group of tasks comprising exchanging one of said data storage media between a respective data storage bin and a selected PDSD;

operator input means for allowing an operator to interact with said user interaction fields;

a library management database, coupled to said library manager controller, containing storage data indicative of respective locations of said data storage media in said manually operated data storage library; and library manager program means in said library manager controller program memory for managing bidirectional communication between said host processing control means and an operator through said host interface logic means and said graphical user interface means in order to carry out the operator task of transferring a data volume from a data storage bin to a PDSD and from a PDSD to a data storage bin.

2. The combination of claim 1 further including a read/write storage device for storing data received from said operator and said host processing control means.

3. The combination of claim 2 further including external device interface logic means for sending data to at least one external device and receiving data from said at least one external device.

4. The combination of claim 3, wherein said external device is an optical scanner, such that data received by said external device interface logic means from said scanner is transmitted to said library manager program means for communication to said read/write storage device.

5. The combination of claim 3, wherein said external device is a large message display panel for displaying said data sent to said external device through said external device interface logic, and also for displaying said data stored on said read/write storage device.

6. The combination of claim 3, wherein said external device interface logic is an Application Program Interface (API).

7. The combination of claim 2, wherein said graphical user interaction fields on said screen include a plurality of selections for allowing an operator to store data on said read/write storage device and said data contains volsers of volumes to be added to said library.

8. The combination of claim 1, wherein at least one of said PDSDs is a tape drive.

9. The combination of claim 1, wherein at least one of said PDSDs is a disk drive.

10. The combination of claim 1, wherein said operator input means is a mouse.

11. The combination of claim 1, wherein said operator input means is a keyboard.

12. The combination of claim 1, wherein said action list window includes commands from said host processing control means to selectively mount or eject at least one of said data volumes.

13. The combination of claim 1, wherein said action list window includes commands from said host processing control means to respond to an error condition at least once of said PDSDs.

14. The combination of claim 1, wherein said action list window includes commands from said host processing control means to clean at least one of said PDSDs.

15. The combination of claim 1, wherein said graphical user interaction fields on said screen include a plurality of selections for allowing an operator to define categories of volsers based on criteria determined by an operator.

16. The combination of claim 1, wherein said graphical user interaction fields on said screen include a plurality of selections for allowing an operator to create a cleaning schedule for said PDSDs.

17. The combination of claim 1, wherein said graphical user interaction fields on said screen include at least one selection allowing an operator to check a status of at least one of said PDSDs.

18. The combination of claim 1, wherein said host interface logic means is an Application Program Interface (API).

19. The combination of claim 1, said fields also including a predefined confirmation field for said operator to confirm performance of library tasks presented in the action list.

20. A method for communicating host processor commands to a human operator and for allowing said human operator to communicate with said host processor and at least one peripheral data storage device (PDSD) in a manually operated data storage library, said library including a plurality of data storage bins, each data storage bin capable of storing one data storage medium therein, each data storage medium including at least one data volume, said library further including one or more peripheral data storage devices (PDSDs), each PDSD capable of having a data volume mounted therein, said library also including a library controller apparatus, said method comprising the steps of:

maintaining a library management database containing storage data indicative of respective locations of said data storage media in said manually operated data storage library;

receiving host processor communication data through host interface logic in said library controller;

presenting said host processor communication data to an operator in a form of graphical user interaction fields presented on a display screen by graphical user interface means, said fields including an action list window visually presenting library tasks for performance of a human operator, each said library task being selected from a group of tasks comprising exchanging one of said data storage media between a respective data storage bin and a selected PDSD;

receiving operator communication data confirming performance of said library task by said operator, said operator communication data being entered from operator input means through said graphical interface means;

presenting said operator communication data to said host processor through said host interface logic; and updating said library management database to reflect any changes in said storage data resulting from performance of said task by said operator.

21. The method of claim 20 including the step of storing said host processor communication data and said operator communication on a read/write storage device connected as part of said library controller.

22. The method of claim 21, including the steps of sending data to an external device through external interface logic in said library controller, and receiving data from said external device through said external interface logic in said library controller.

23. The method of claim 22, wherein said external device is an optical scanner, such that data received by said external device interface logic means from said scanner is transmitted to said library controller apparatus for communication to said read/write storage device.

24. The method of claim 22, wherein said external device is a large message display panel for displaying said data sent to said external device through said external device interface logic and for displaying said data stored on said read/write storage device.

25. The method of claim 22, wherein said external device interface logic is an Application Program Interface (API).

26. The method of claim 21, wherein said graphical user interaction fields on said screen include a plurality of selections for allowing an operator to store data on said read/write storage device, wherein said data contains volsers of volumes to be added to said library.

27. The method of claim 20, wherein at least one of said PDSDs is a tape drive.

28. The method of claim 20, wherein at least one of said PDSDs is a disk drive.

29. The method of claim 20, wherein said operator input means is a mouse.

30. The method of claim 20, wherein said operator input means is a keyboard.

31. The method of claim 20, wherein said group of library tasks commands from said host processor to selectively mount or eject one or more of said data volumes.

32. The method of claim 20, wherein said group of library tasks includes commands from said host processor to respond to an error condition at least one of said PDSDs.

33. The method of claim 20, wherein said group of library tasks includes commands from said host processor to clean at least one of said PDSDs.

34. The method of claim 20, wherein said graphical user interaction fields on said screen include a plurality of selections for allowing an operator to define categories of volsers based on criteria determined by an operator.

35. The method of claim 20, wherein said graphical user interaction fields on said screen include at least one selection allowing an operator to create a cleaning schedule for said PDSDs.

36. The method of claim 20, wherein said graphical user interaction fields on said screen include at least one selection allowing an operator to check a status of at least one of said PDSDs.

37. The method of claim 20, wherein said host interface logic is an Application Program Interface (API).

38. The method of claim 20, further comprising the step of presenting a predefined confirmation field on said display screen for said operator to confirm performance of library tasks presented in the action list.

39. A librarian workstation apparatus for use in a manually operated data storage library, said library including a plurality of storage bins, each data storage bin capable of storing one data storage medium therein, each data medium including at least one data volume, said library further including one or more peripheral data storage devices (PDSDs) and a host processing control means interconnected with said PDSDs, said workstation comprising:

a library manager controller including program memory, a hard disk for storing data, a data path to said host processing control means, and host interface logic means for communicating with said host processing control means;

a display device having a screen and being connected to said library manager controller for alerting said operator of a task to transfer a data volume from a data storage bin to a PDSD and from a PDSD to a data storage bin;

said library manager controller further including graphical user interface means for constructing graphical user interaction fields on said screen, said fields including an action list window visually presenting library tasks for performance by a human operator, each said library task being selected from a group of tasks comprising exchanging one of said data storage media between a respective data storage bin and a selected PDSD;

operator input means for allowing an operator to interact with said user interaction fields;

library manager program means loaded in said program memory for managing bidirectional communication between said host processing control means and an operator through said host interface logic means and said graphical user interface means in order to carry out the operator task of transferring a data volume from a data storage bin to a PDSD and from a PDSD to a data storage bin;

a library management database, coupled to said library manager controller, containing storage data indicative of respective locations of said data storage media in said manually operated data storage library; and external interface logic for sending data to an external device and receiving data from said external device.

40. The apparatus of claim 39, wherein said host interface logic means is an Application Program Interface (API).

41. The apparatus of claim 39, wherein said external device interface logic is an Application Program Interface (API).

42. The apparatus of claim 39, said fields also including a predefined confirmation field for said operator to confirm performance of library tasks presented in the action list.

* * * * *